(12) United States Patent
Hamasaki et al.

(10) Patent No.: US 7,580,235 B2
(45) Date of Patent: Aug. 25, 2009

(54) SYSTEMS AND METHODS FOR MONITORING AND CONTROLLING CIRCUIT BREAKERS

(75) Inventors: George H. Hamasaki, Lake Stevens, WA (US); Joseph A. Sikora, Seattle, WA (US); Bryan P. Kesterson, Kent, WA (US); Gregory P. Owens, Everett, WA (US); Justin E. Hale, Woodinville, WA (US); Norman F. Kirby, Bothell, WA (US); Thanh-Ha N. Herter, Edmonds, WA (US); Michael B. McAvoy, Lynnwood, WA (US); Phuoc D. Nguyen, Mukilteo, WA (US); Robert J. Crane, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 459 days.

(21) Appl. No.: 11/249,127

(22) Filed: Oct. 11, 2005

(65) Prior Publication Data
US 2006/0108873 A1 May 25, 2006

Related U.S. Application Data

(60) Provisional application No. 60/663,455, filed on Mar. 18, 2005, provisional application No. 60/618,295, filed on Oct. 12, 2004.

(51) Int. Cl.
*H01H 73/00* (2006.01)
(52) U.S. Cl. ..................................................... 361/115
(58) Field of Classification Search ................. 361/115, 361/62
See application file for complete search history.

(56) References Cited

U.S. PATENT DOCUMENTS 3,698,671 A 10/1972 Steigleder et al.
(Continued)

FOREIGN PATENT DOCUMENTS

DE 3315386 10/1984
(Continued)

OTHER PUBLICATIONS

Hutchins. Edwin, "The Integrated Mode Management Interface," Department of Cognitive Science, University of California, San Diego, Sep. 17, 1996.
(Continued)

*Primary Examiner*—Stephen W Jackson
(74) *Attorney, Agent, or Firm*—Perkins Coie LLP

(57) ABSTRACT

Systems and methods for presenting information corresponding to circuit breakers and for controlling such circuit breakers are disclosed. In one embodiment, the system can include a menu-driven, pointer-accessible graphical user interface via which an operator can receive information corresponding to circuit breakers, and can automatically change the states of the circuit breakers. Menus of circuit breaker information can be organized by the state of the circuit breaker, the location of the circuit breaker, the bus to which the circuit breaker is coupled, the electrical system to which the circuit breaker belongs, and/or the system or subsystem of which the circuit breaker is a part. In further embodiments, the circuit breaker information can be organized according to custom-made arrangements.

25 Claims, 21 Drawing Sheets

U.S. PATENT DOCUMENTS

| | | |
|---|---|---|
| 4,196,474 A | 4/1980 | Buchanan et al. |
| 4,212,064 A | 7/1980 | Forsythe et al. |
| 4,247,843 A | 1/1981 | Miller et al. |
| 4,274,096 A | 6/1981 | Dennison |
| 4,325,123 A | 4/1982 | Graham et al. |
| 4,471,439 A | 9/1984 | Robbins et al. |
| 4,631,678 A | 12/1986 | Angermuller et al. |
| 4,642,775 A | 2/1987 | Cline |
| 4,729,102 A | 3/1988 | Miller, Jr. et al. |
| 4,792,906 A | 12/1988 | King et al. |
| 4,860,007 A | 8/1989 | Konicke et al. |
| 4,939,661 A | 7/1990 | Barker et al. |
| 5,050,081 A | 9/1991 | Abbott |
| 5,070,458 A | 12/1991 | Gilmore et al. |
| 5,072,218 A | 12/1991 | Spero et al. |
| 5,243,339 A | 9/1993 | Graham et al. |
| 5,283,643 A | 2/1994 | Fujimoto |
| 5,289,185 A | 2/1994 | Ramier et al. |
| 5,329,277 A | 7/1994 | Dougan et al. |
| 5,337,982 A | 8/1994 | Sherry |
| 5,416,705 A | 5/1995 | Barnett |
| 5,420,582 A | 5/1995 | Kubbat |
| 5,454,074 A | 9/1995 | Hartel et al. |
| 5,475,594 A | 12/1995 | Oder et al. |
| 5,499,025 A | 3/1996 | Middleton et al. |
| 5,519,392 A | 5/1996 | Oder et al. |
| 5,523,949 A | 6/1996 | Agate et al. |
| 5,668,542 A | 9/1997 | Wright |
| 5,715,163 A | 2/1998 | Bang |
| 5,739,769 A | 4/1998 | Vladimir et al. |
| 5,802,492 A | 9/1998 | DeLorme et al. |
| 5,844,503 A | 12/1998 | Riley et al. |
| 5,884,219 A | 3/1999 | Curtwright et al. |
| 5,916,297 A | 6/1999 | Griffin, III et al. |
| 5,940,013 A | 8/1999 | Vladimir et al. |
| 5,941,930 A | 8/1999 | Morimoto et al. |
| 5,971,318 A | 10/1999 | Lustre |
| 5,978,715 A | 11/1999 | Briffe et al. |
| 5,995,290 A | 11/1999 | Noble |
| 5,995,901 A | 11/1999 | Owen et al. |
| 6,038,498 A | 3/2000 | Briffe et al. |
| 6,057,786 A | 5/2000 | Briffe et al. |
| 6,067,502 A | 5/2000 | Hayashida et al. |
| 6,072,473 A | 6/2000 | Muller et al. |
| 6,085,129 A | 7/2000 | Schardt et al. |
| 6,098,014 A | 8/2000 | Kranz |
| 6,112,141 A | 8/2000 | Briffe et al. |
| 6,118,385 A | 9/2000 | Leard et al. |
| 6,154,151 A | 11/2000 | McElreath et al. |
| 6,175,315 B1 | 1/2001 | Millard et al. |
| 6,181,987 B1 | 1/2001 | Deker et al. |
| 6,188,937 B1 | 2/2001 | Sherry et al. |
| 6,246,320 B1 | 6/2001 | Monroe |
| 6,262,720 B1 | 7/2001 | Jeffrey et al. |
| 6,275,172 B1 | 8/2001 | Curtis et al. |
| 6,278,913 B1 | 8/2001 | Jiang et al. |
| 6,313,759 B1 | 11/2001 | Musland-Sipper |
| 6,314,366 B1 | 11/2001 | Farmakis et al. |
| 6,314,370 B1 | 11/2001 | Curtright |
| 6,335,694 B1 | 1/2002 | Beksa et al. |
| 6,346,892 B1 | 2/2002 | DeMers et al. |
| 6,362,750 B1 | 3/2002 | Castor et al. |
| 6,381,519 B1 | 4/2002 | Snyder |
| 6,381,538 B1 | 4/2002 | Robinson et al. |
| 6,389,333 B1 | 5/2002 | Hansman et al. |
| 6,405,975 B1 | 6/2002 | Sankrithi et al. |
| 6,424,909 B2 | 7/2002 | Kusano et al. |
| 6,443,399 B1 | 9/2002 | Yount et al. |
| 6,449,555 B1 | 9/2002 | Pauly |
| 6,466,235 B1 | 10/2002 | Smith et al. |
| 6,470,224 B1 * | 10/2002 | Drake et al. ............... 700/22 |
| 6,473,675 B2 | 10/2002 | Sample |
| 6,512,527 B1 | 1/2003 | Barber et al. |
| 6,522,958 B1 | 2/2003 | Dwyer et al. |
| 6,542,796 B1 | 4/2003 | Gibbs et al. |
| 6,556,902 B2 | 4/2003 | Ing et al. |
| 6,633,810 B1 | 10/2003 | Qureshi et al. |
| 6,636,786 B2 | 10/2003 | Partel |
| 6,668,215 B2 | 12/2003 | Lafon |
| 6,690,299 B1 | 2/2004 | Suiter |
| 6,696,980 B1 | 2/2004 | Langner et al. |
| 6,697,718 B2 | 2/2004 | La Draoullec et al. |
| 6,707,387 B2 | 3/2004 | Noguchi et al. |
| 6,711,475 B2 | 3/2004 | Murphy |
| 6,720,891 B2 | 4/2004 | Chen et al. |
| 6,721,640 B2 | 4/2004 | Glenn et al. |
| 6,745,113 B2 | 6/2004 | Griffin, III et al. |
| 6,753,891 B1 | 6/2004 | Chohan et al. |
| 6,759,946 B2 * | 7/2004 | Sahinoglu et al. ...... 340/310.11 |
| 6,784,869 B1 | 8/2004 | Clark et al. |
| 6,812,858 B2 | 11/2004 | Griffin et al. |
| 6,816,780 B2 | 11/2004 | Naimer et al. |
| 6,856,864 B1 | 2/2005 | Gibbs et al. |
| 6,870,490 B2 | 3/2005 | Sherry et al. |
| 6,871,124 B1 | 3/2005 | McElreath |
| 6,898,492 B2 | 5/2005 | De Leon |
| 6,909,967 B2 | 6/2005 | Hirano et al. |
| 6,915,190 B2 | 7/2005 | Galasso et al. |
| 6,934,608 B2 | 8/2005 | Qureshi et al. |
| 7,177,731 B2 | 9/2005 | Griffin III et al. |
| 6,980,198 B1 | 12/2005 | Gyde et al. |
| 6,992,596 B2 | 1/2006 | Cole et al. |
| 6,992,597 B2 | 1/2006 | Rogers et al. |
| 7,030,892 B1 | 4/2006 | Gyde et al. |
| 7,103,455 B2 | 9/2006 | Subelet |
| 7,142,131 B2 | 11/2006 | Sikora et al. |
| 7,148,814 B2 | 12/2006 | Sikora et al. |
| 7,181,478 B1 | 2/2007 | Korson |
| 7,188,007 B2 | 3/2007 | Boorman et al. |
| 7,203,577 B2 | 4/2007 | Griffin, III et al. |
| 7,216,069 B2 | 5/2007 | Hett |
| 7,222,017 B2 | 5/2007 | Clark et al. |
| 7,256,710 B2 | 8/2007 | Griffin, III et al. |
| 7,363,119 B2 | 4/2008 | Griffin, III et al. |
| 7,418,319 B2 | 8/2008 | Chen |
| 2003/0025719 A1 | 2/2003 | Palmer et al. |
| 2003/0132860 A1 | 7/2003 | Feyereisen et al. |
| 2003/0225492 A1 | 12/2003 | Cope et al. |
| 2004/0059474 A1 | 3/2004 | Boorman et al. |
| 2005/0143871 A1 | 6/2005 | Boorman et al. |
| 2005/0178903 A1 | 8/2005 | Boorman et al. |
| 2005/0182528 A1 | 8/2005 | Dwyer et al. |
| 2005/0192717 A1 | 9/2005 | Tafs et al. |
| 2005/0203675 A1 | 9/2005 | Griffin et al. |
| 2005/0222721 A1 | 10/2005 | Chen et al. |
| 2005/0228674 A1 | 10/2005 | Gunn et al. |
| 2005/0283305 A1 | 12/2005 | Clark et al. |
| 2006/0005147 A1 | 1/2006 | Hammack et al. |
| 2008/0316058 A1 | 12/2008 | Chen |

FOREIGN PATENT DOCUMENTS

| | | |
|---|---|---|
| EP | 0286120 | 10/1988 |
| EP | 0370640 | 5/1990 |
| EP | 0489521 | 6/1992 |
| EP | 1273987 | 1/2003 |
| FR | 2817831 | 6/2004 |
| FR | 2848306 | 6/2004 |
| GB | 886136 | 1/1962 |
| WO | WO 2002024530 | 3/2002 |

| | | |
|---|---|---|
| WO | WO 2004027732 | 4/2004 |

OTHER PUBLICATIONS

Painter et al., "Decision Support for the General Aviation Pilot," Systems, Man, and Cybernetics, IEEE International Conference on Computational Cybernetics and Simulation, Orlando, FL, Oct 12-15, 1997, pp. 88-93.

Hooey et al., "Integrating datalink and cockpit display technologies into current and future taxi operations," Digital Avionics Systems Conferences, V2, 8 pages (2000).

\* cited by examiner

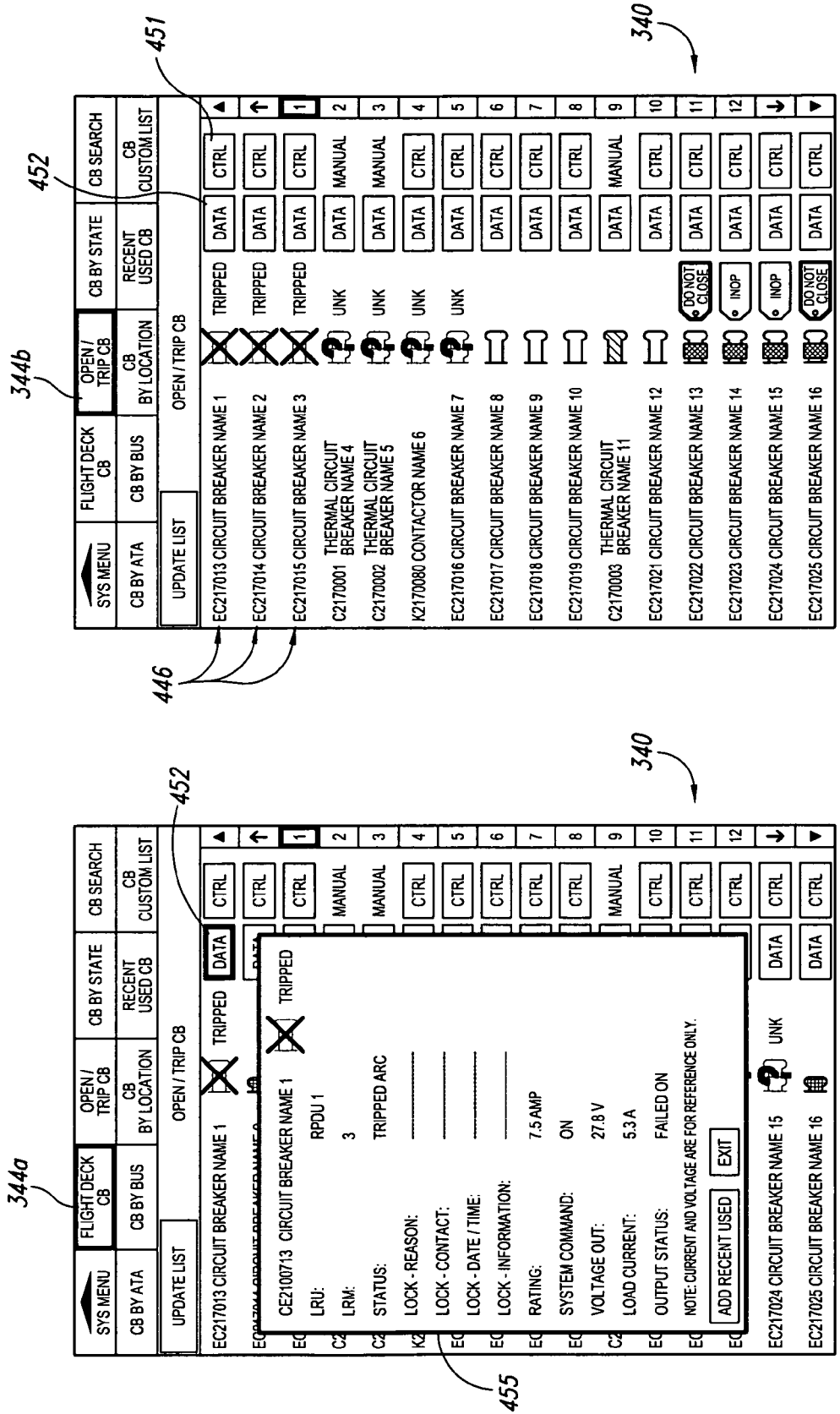

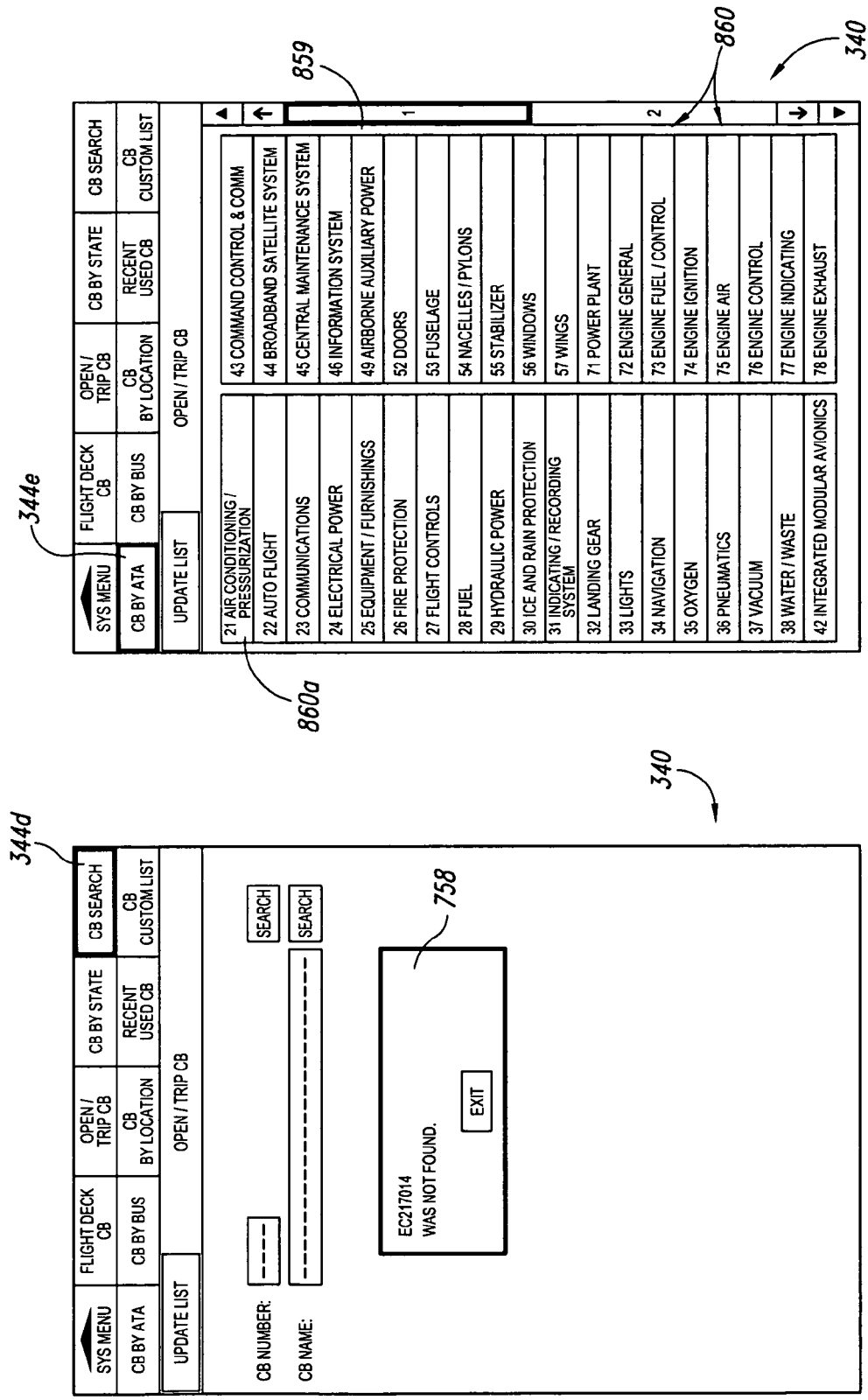

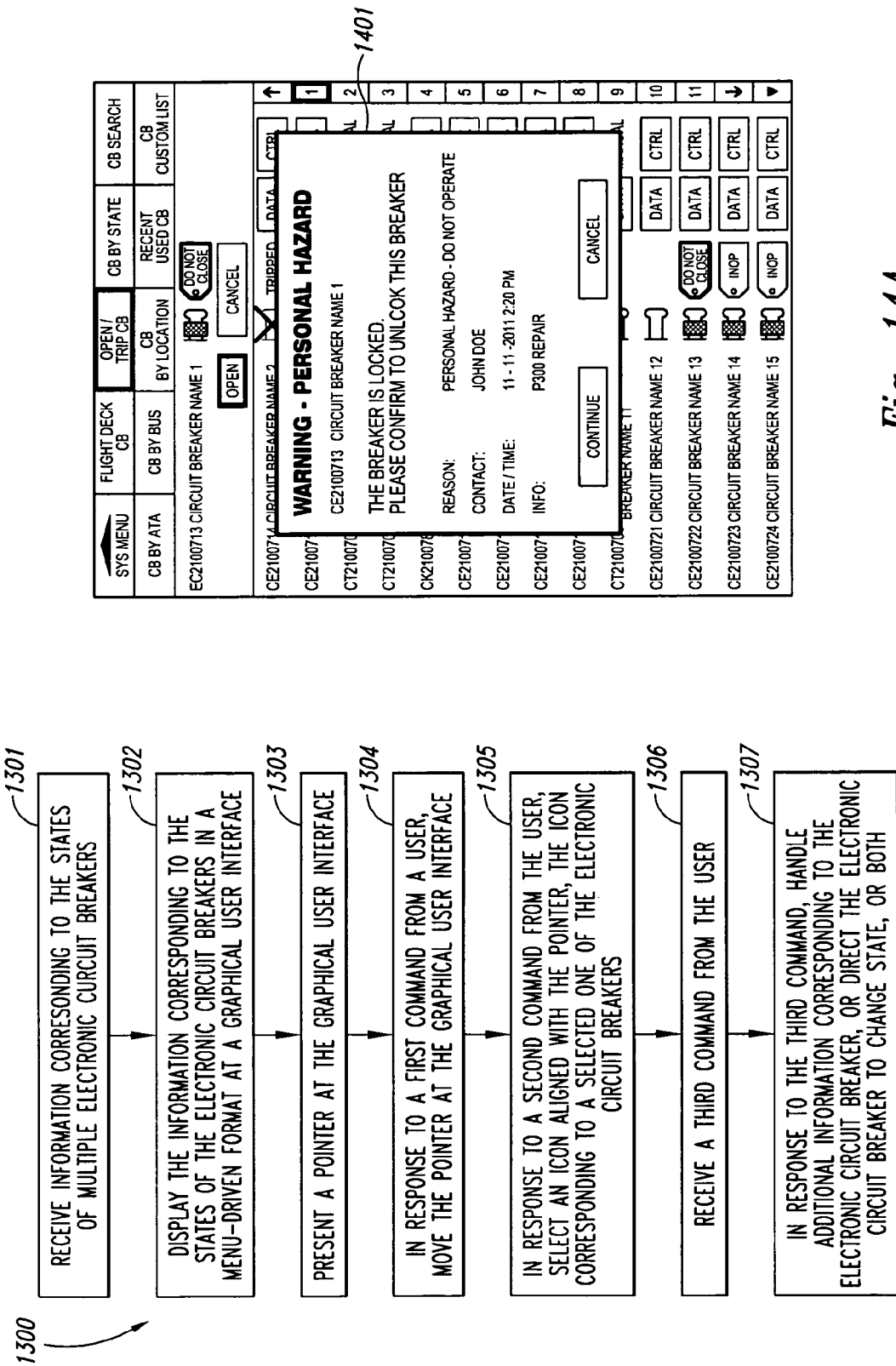

SYSTEMS AND METHODS FOR MONITORING AND CONTROLLING CIRCUIT BREAKERS

CROSS-REFERENCE TO RELATED APPLICATIONS

The present application claims priority to U.S. Provisional Application 60/618,295, filed Oct. 12, 2004, and U.S. Provisional Application 60/663,455, filed Mar. 18, 2005, both of which are incorporated herein by reference.

TECHNICAL FIELD

The present invention is directed generally to systems and methods for monitoring and controlling circuit breakers, including circuit breaker networks on transport aircraft.

BACKGROUND

Typical commercial transport aircraft include multiple, complex electrical systems and hundreds of circuit breakers to protect those systems. Existing aircraft typically include thermal circuit breakers which must be manually reset once they are tripped. Because this approach requires a substantial amount of aircraft wiring, and is heavy and not optimally efficient, some aircraft manufacturers have begun installing remotely located, solid state or electronic circuit breakers coupled to a data bus, in place of thermal circuit breakers. An electronic circuit breaker can provide electrical signals indicating the states of the circuit breakers (e.g., open, closed, or tripped) and can respond to electrical signals to change state. Accordingly, mechanics, pilots, or other users at an aircraft flight deck can determine the states of remotely located circuit breakers, and can change the states of such circuit breakers from the flight deck.

FIG. 1 illustrates a typical existing control and display unit (CDU) 12 that can be used to monitor and control electronic aircraft circuit breakers. The CDU 12 can include a display screen 13 and a series of line select buttons 14. The display screen 13 can present multiple pages of circuit breaker status information when the user manipulates the line select button or other keys. The line select buttons 14 can be used to select one of the circuit breakers identified at the display screen 13, and the line select buttons 14 or other hardware buttons at the CDU 12 can be used to change the states of the circuit breakers.

One drawback associated with the foregoing system described above with reference to FIG. 1 is that it may be time-consuming for the mechanic or other aircraft operator or user to locate a desired circuit breaker and change its state. Accordingly, the user may not operate efficiently when monitoring and controlling aircraft circuit breakers, which can reduce the overall efficiency with which the user controls the aircraft.

SUMMARY

The following summary is provided for the benefit of the reader only, and is not intended to limit in any way the invention as set forth by the claims. A method for handling circuit breaker information and/or state changes in accordance with one aspect of the invention includes receiving information corresponding to the states of multiple electronic circuit breakers, and displaying the information in a menu-driven format at a graphical user interface. The method can further include presenting a pointer at the graphical user interface and, in response to a first command from a user, moving the pointer at the graphical user interface. In response to a second command from the user, the method can further include selecting an icon aligned with the pointer, wherein the icon corresponds to a selected one of the electronic circuit breakers. The method can still further include receiving a third command from the user, and in response to receiving the third command, handling additional information corresponding to the electronic circuit breaker, or directing the electronic circuit breaker to change state, or both.

In particular embodiments, displaying information corresponding to the states of the circuit breakers can include displaying information corresponding to at least one of a closed, open, tripped, and locked state. Directing an electronic circuit breaker to change state can include directing multiple electronic circuit breakers to change state in an at least approximately simultaneous manner. The information corresponding to the states of the electronic circuit breakers can be presented in a non-textual, graphical manner.

An aircraft in accordance with another aspect of the invention includes a fuselage having a flight deck, a wing coupled to the fuselage, a plurality of electrical systems having at least a corresponding plurality of circuit breakers including at least one electronic circuit breaker. The aircraft can further include a computer that is operatively coupled to the circuit breakers and which in turn includes a receiver configured to receive information corresponding at least in part to the states of the multiple electronic circuit breakers. The computer can further include a display medium configured to display the information corresponding at least in part to the states of the electronic circuit breakers in a menu-driven format at a graphical user interface. The computer can still further include a computer readable medium configured to move a pointer at the graphical user interface in response to a first command from a user, select an icon aligned with the pointer in response to a second command from the user, and direct the electronic circuit breaker to change state, or handle additional information corresponding to the circuit breaker, or both, in response to a third command from the user.

BRIEF DESCRIPTION OF THE DRAWINGS

FIGS. 3A-3B illustrate a graphical user interface displaying menus for selecting aircraft circuit breakers in accordance with an embodiment of the invention.

FIGS. 4A-4B illustrate a graphical user interface displaying circuit breaker indicators and selectors in accordance with an embodiment of the invention.

FIG. 5 illustrates a graphical user interface displaying circuit breaker display fields for non-normal circuit breakers in accordance with an embodiment of the invention.

FIG. 6 illustrates a graphical user interface presenting circuit breaker display fields for recently accessed and/or manipulated circuit breakers in accordance with an embodiment of the invention.

FIGS. 7A-7D illustrate graphical user interfaces presenting displays for searching circuit breaker identifiers in accordance with an embodiment of the invention.

FIGS. 8A-8C illustrate graphical user interfaces presenting circuit breaker information by system or subsystem grouping in accordance with an embodiment of the invention.

FIG. 13 is a flow diagram illustrating a process carried out in accordance with an embodiment of the invention.

FIGS. 14A-G illustrate graphical user interfaces presenting custom lists of circuit breakers in accordance with still further embodiments of the invention.

DETAILED DESCRIPTION

Figure 1:
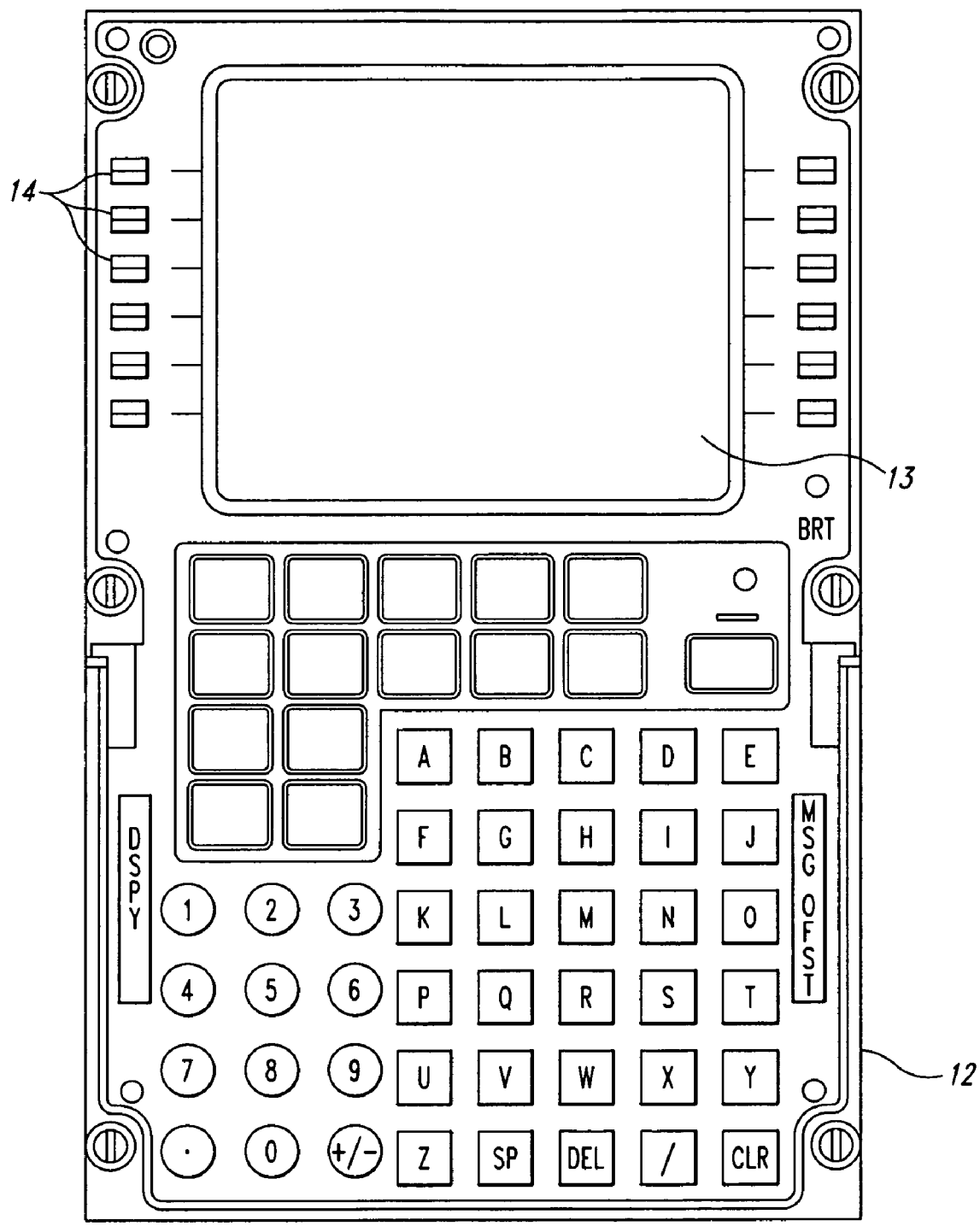
FIG. 1 illustrates a control and display unit (CDU) in accordance with the prior art.

The following disclosure describes systems and methods for monitoring and controlling circuit breakers, including aircraft circuit breakers, via graphical user interfaces (GUIs). Certain specific details are set forth in the following description in FIGS. 2-14G to provide a thorough understanding of various embodiments of the invention. Well-known structures, systems and methods often associated with these systems have not been shown or described in detail to avoid unnecessarily obscuring the description of the various embodiments of the invention. In addition, those of ordinary skill in the relevant art will understand that additional embodiments of the invention may be practiced without several of the details described below.

Many of the embodiments of the invention described below may take the form of computer-executable instructions, including routines executed by a programmable computer. Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below. Accordingly, the term "computer" as generally used herein refers to any data processor and can include Internet appliances, hand-held devices (including palmtop computers, wearable computers, cellular or mobile phones, multi-processor systems, processor-based or programmable consumer electronics, network computers, mini computers and the like). Information presented by these computers can be presented at any suitable display medium, including a CRT display or LCD.

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic or optically readable or removable computer disks, as well as distributed electronically open networks. Data structures and transmissions of data particular to aspects of the invention are also encompassed within the scope of the invention. Communications between components of the computing environment can be via any number of communication links, including wired links, fiber optic links, and wireless links.

Certain aspects of the invention are directed to graphical user interfaces (GUIs). As used herein, the terms graphical user interface and GUI refer generally to display formats (e.g., accessible via computer readable media) that enable a user to view lists of available commands, options and/or information and choose commands by pointing to a representation (e.g., a pictorial representation, such as an icon, or a textual representation). The user can control the motion of the pointer and then activate his or her choice via an input device (e.g., a keyboard or mouse).

Figure 2:
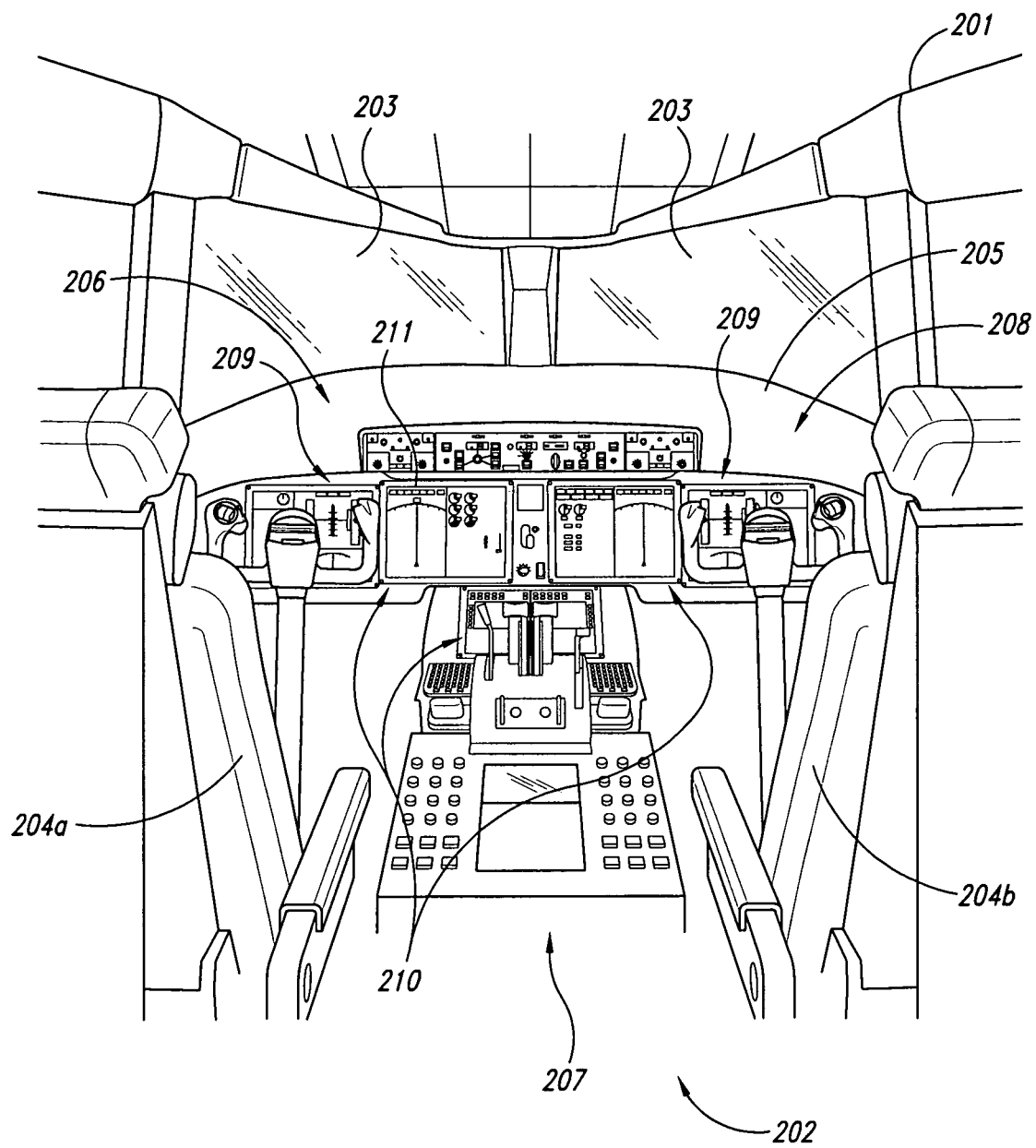
FIG. 2 illustrates an aircraft flight deck that can support systems and methods in accordance with embodiments of the invention.

FIG. 2 illustrates a forward portion of an aircraft 201 having a flight deck 202 that can house systems in accordance with embodiments of the invention. The flight deck 202 can include forward windows 203 providing a forward field of view from the aircraft 201 for an operator seated in a first seat 204*a* and/or a second seat 204*b*. In other embodiments, the forward windows 203 can be replaced with one or more external vision screens that include a visual display of the forward field of view out of the aircraft 201. A glare shield 205 can be positioned adjacent to the forward windows 203 to reduce the glare on one or more flight instruments 206 positioned on a control pedestal 207 and a forward instrument panel 208.

The flight instruments 206 can include primary flight displays (PFDs) 209 that provide the operators with actual flight parameter information, and multifunction displays (MFDs) 210 that display other operator-selectable information. For example, one or more of the MFDs 210 can present a navigation display 211 containing navigational information. Other MFDs 210 can present information pertaining to aircraft circuit breakers, as described in greater detail below. The information can also be presented at other display locations, including portable display terminals that can be positioned at other locations in the aircraft.

Figure 3A:
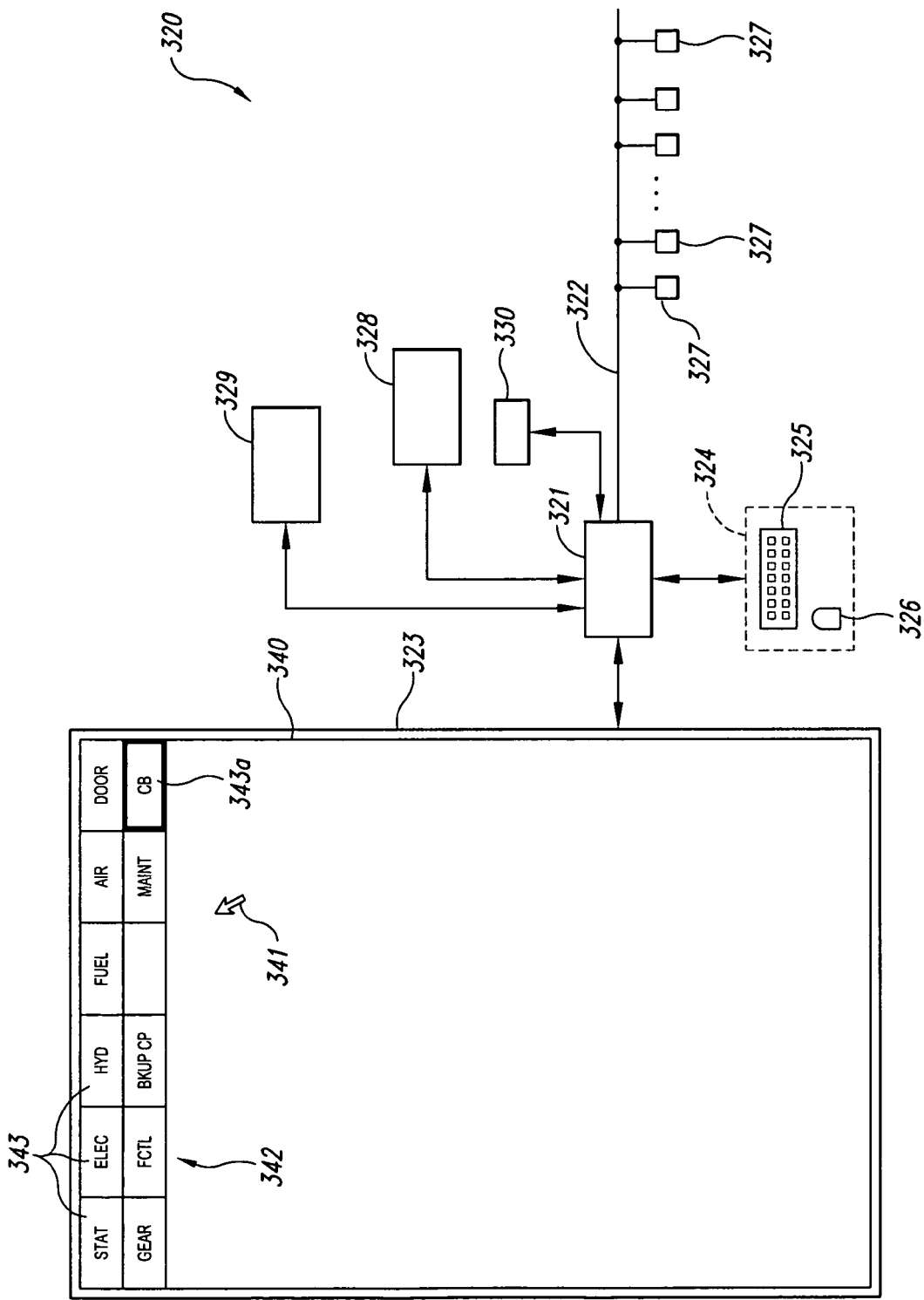

FIG. 3A is a partially schematic illustration of a system 320 that presents information corresponding to a plurality of circuit breakers, and allows the user to control those circuit breakers. In a particular aspect of this embodiment, the system 320 includes multiple circuit breakers 327 coupled to a data bus 322. The circuit breakers 327 can include solid state power controllers (SSPCs) solid state relays (SSRs), and/or other electronic power control devices (e.g., electrical load controller functions, or ELCFs) configured to provide a circuit breaker function, and are commonly referred to as electronic circuit breakers (ECBs). The data bus 322 to which the circuit breakers 327 are coupled is in turn coupled to a processor 321. Accordingly, the processor 321 can receive signals from the circuit breakers 327 (e.g., corresponding to states of the circuit breakers 327) and can provide or direct signals to the circuit breakers 327 (e.g., to change the states of the circuit breakers 327). For some circuit breakers (e.g., mechanical devices), the state of the circuit breaker can be monitored and presented, but not changed in an automated fashion. For purposes of illustration, a single data bus 322 is shown in FIG. 3A, though it will be understood by those of ordinary skill in the art that the system 320 can include multiple data buses 322 in other embodiments.

The processor 321 can be coupled to one or more memory devices 330 and one or more display media 323 at which information corresponding to the circuit breakers 327 is displayed and via which a user can control the circuit breakers 327. In a particular aspect of this embodiment, the display medium 323 can present a graphical user interface (GUI) 340 that includes user-selectable indicators or icons (hereinafter, selectors) 343 in a menu format 342. The GUI 340 can also present a movable pointer 341 that the user can manipulate to select and activate any of the selectors 343. Accordingly, the display medium 323 can be coupled to input/output devices 324, e.g., a keyboard 325 and/or a mouse 326. The user can manipulate the pointer 341 and activate the selectors 343 using techniques generally known to those of ordinary skill in the relevant art. The processor 321 can also interact with other computers or computer systems 328 and/or other displays 329. Accordingly, the processor 321 can transmit data to systems other than the display medium 323, as will be described in greater detail later. Any of the links between system components can be hardwired or wireless, depending upon the nature of the components and the particular installation.

Figures 3B, 4A:
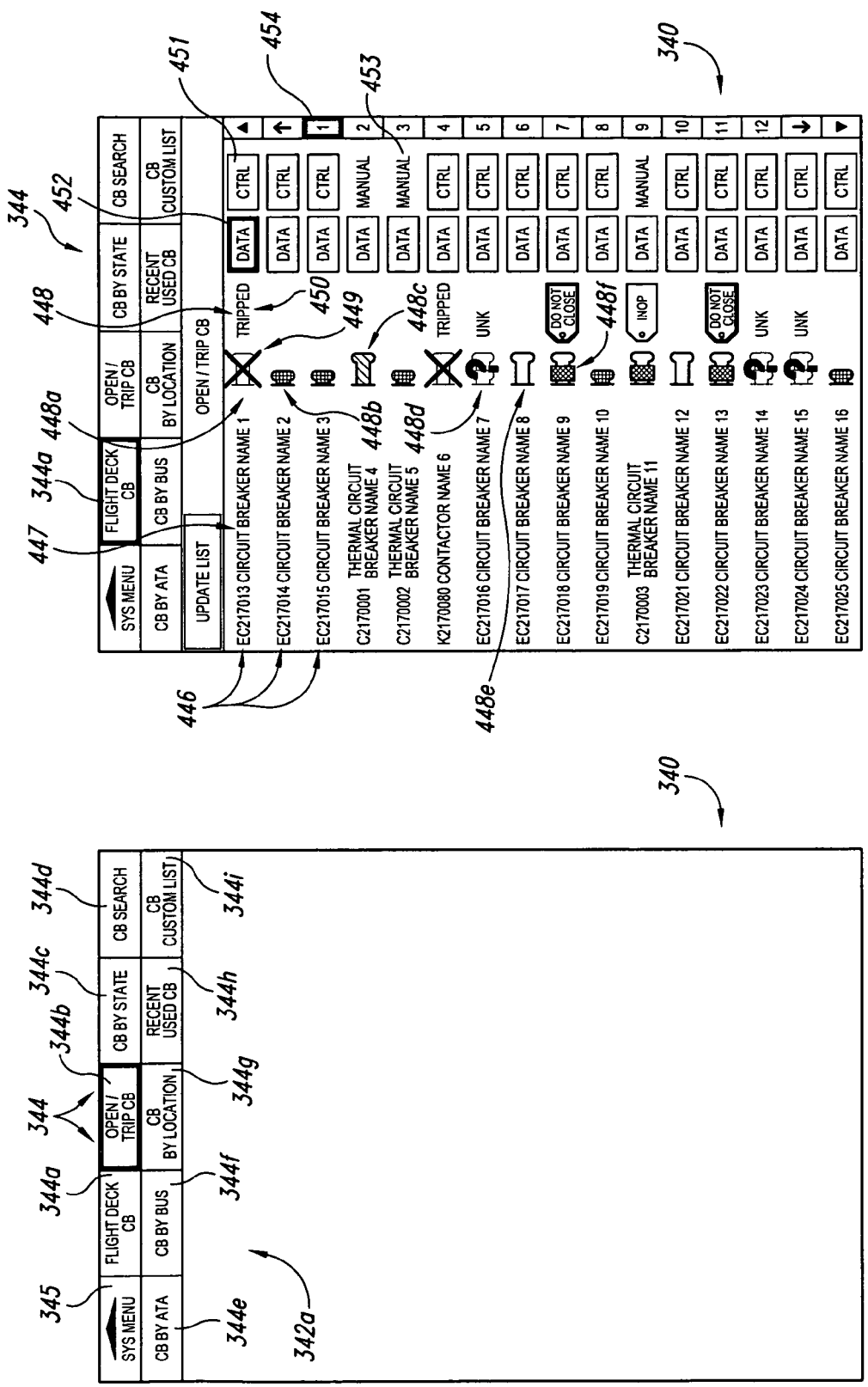

One of the selectors 343 presented at the GUI 340 can include a circuit breaker selector 343a, which is shown activated in FIG. 3A. For purposes of illustration, activated selectors are shown in the Figures with heavy outlines. In other embodiments, such selectors may be indicated by a different color or other distinguishing characteristic. When the user activates the selector 343a, as shown in FIG. 3A a circuit breaker menu 342a appears at the GUI 340, as shown in FIG. 3B. The circuit breaker menu 342a can include a return selector 345 and a plurality of circuit breaker selectors 344, shown in FIG. 3B as selectors 344a-344i. The operation of each of the circuit breaker selectors 344a-344i is described in greater detail below with reference to FIGS. 4A-12B.

FIG. 4A illustrates the GUI 340 after a flight deck CB selector 344a has been activated, with "CB" providing a shorthand for "circuit breaker." The GUI 340 accordingly presents a list of circuit breaker display fields 446, each of which corresponds to a circuit breaker for equipment located at the aircraft flight deck or a circuit breaker that may be found at the flight deck. Each circuit breaker display field 446 can include an identifier 447 (e.g., an alphanumeric description of a circuit breaker), a status indicator 448 (indicating the status of the circuit breaker), a control selector 451 (which can be selected by the user to control the circuit breaker), and a data selector 452 (which can be selected by the user to present further data corresponding to the circuit breaker). The status indicator 448 can include a symbol 449, optionally accompanied by text 450 to graphically and, optionally textually, present the state of each circuit breaker to the user. Accordingly, the status indicators 448 can include a tripped indicator 448a, a closed indicator 448b, an open manual indicator 448c (corresponding to an open circuit breaker that must be manually reset, e.g., a mechanical circuit breaker), an open electronic indicator 448e, an unknown status indicator 448d, and a locked indicator 448f (corresponding to a circuit breaker that has been locked so as not to change state).

Each indicator 448 can be easily visually distinguished from the others, and can have an appearance that emulates a conventional circuit breaker. For example, the closed indicator 448b can emulate a conventional circuit breaker switch that has been depressed, and the tripped and open indicators 448a, 448c and 448 can emulate a conventional circuit breaker switch that has "popped" open. Circuit breakers that can only be controlled manually can be further highlighted by manual identifiers 453. Such circuit breakers can be coupled to detectors that detect the states of the circuit breakers, and can direct the state information to the processor 321 (FIG. 3A). The GUI 340 can also include page selectors 454 that allow the user to page through lists of circuit breakers, e.g., when the number of circuit breakers corresponding to a given circuit breaker selector 344 exceeds the display capacity of a single screen. In other embodiments, the GUI 340 can include a scroll bar in addition to or in lieu of the page selectors 454.

FIG. 4B illustrates a data display 455 presented when the user activates the data selector 452. The data display 455 can present additional information corresponding to the status of the selected circuit breaker, the capacity of the circuit breaker, and/or other information.

FIGS. 4A-4B illustrate displays associated with circuit breakers of equipment located at the aircraft flight deck and/or circuit breakers that would be located at the flight deck to provide timely access by the flight crew. The displayed circuit breakers correspond to the flight deck CB selector 344a. However, the user may wish to quickly view information regarding circuit breakers having other locations and/or characteristics. For example, the user may wish to examine and/or control only circuit breakers having an open/tripped (e.g., non-closed) status. Accordingly, as shown in FIG. 5 the operator can activate an open/tripped CB selector 344b to obtain a list of circuit breaker display fields 446, with each display field 446 corresponding to a circuit breaker having an open/tripped status. In a particular aspect of this embodiment, the open/tripped circuit breakers are grouped according to state (e.g., tripped, unknown, opened, and locked). In other embodiments, the open/tripped circuit breakers can be grouped in other manners. In any of these embodiments, the user can obtain additional details of each of the circuit breakers by activating the data selectors 452, and/or the user can control the circuit breakers by activating the control selectors 451. Further details of the operation of the control selectors 451 are described later with reference to FIG. 11A-11H.

Figures 6, 7A:
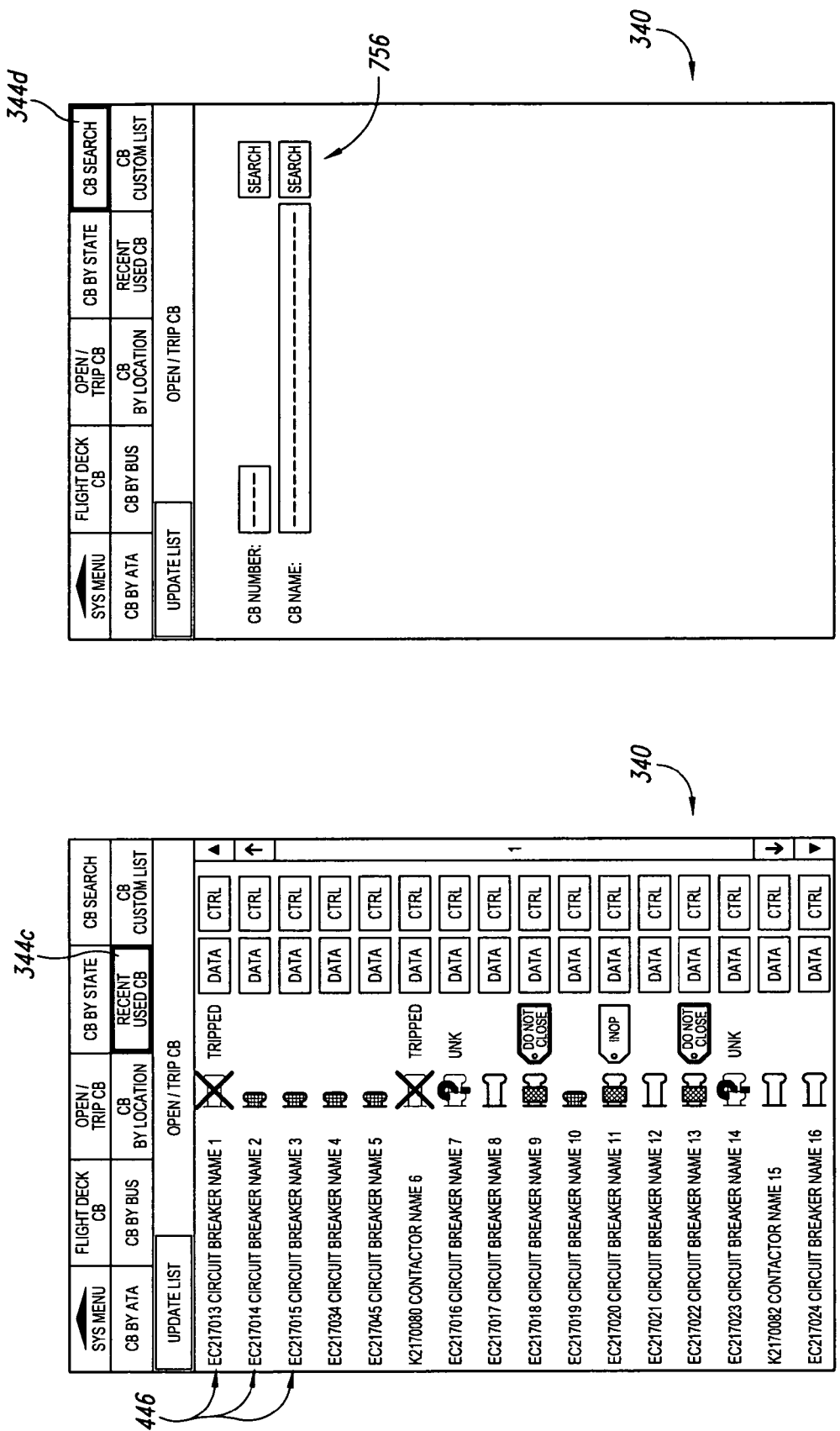

FIG. 6 illustrates the graphical user display 340 after the user has selected a recently used CB selector 344c. Accordingly, the GUI 340 presents a list of circuit breaker display fields 446 corresponding to the most recent circuit breakers that have been accessed, manipulated or changed (e.g., via a state change) by any user. An advantage of this arrangement is that, if the user wishes to quickly change the status of a circuit breaker that was recently accessed, manipulated, or changed, the user can quickly identify that circuit breaker without having to recall which circuit breaker it was.

Figures 7B, 7C:
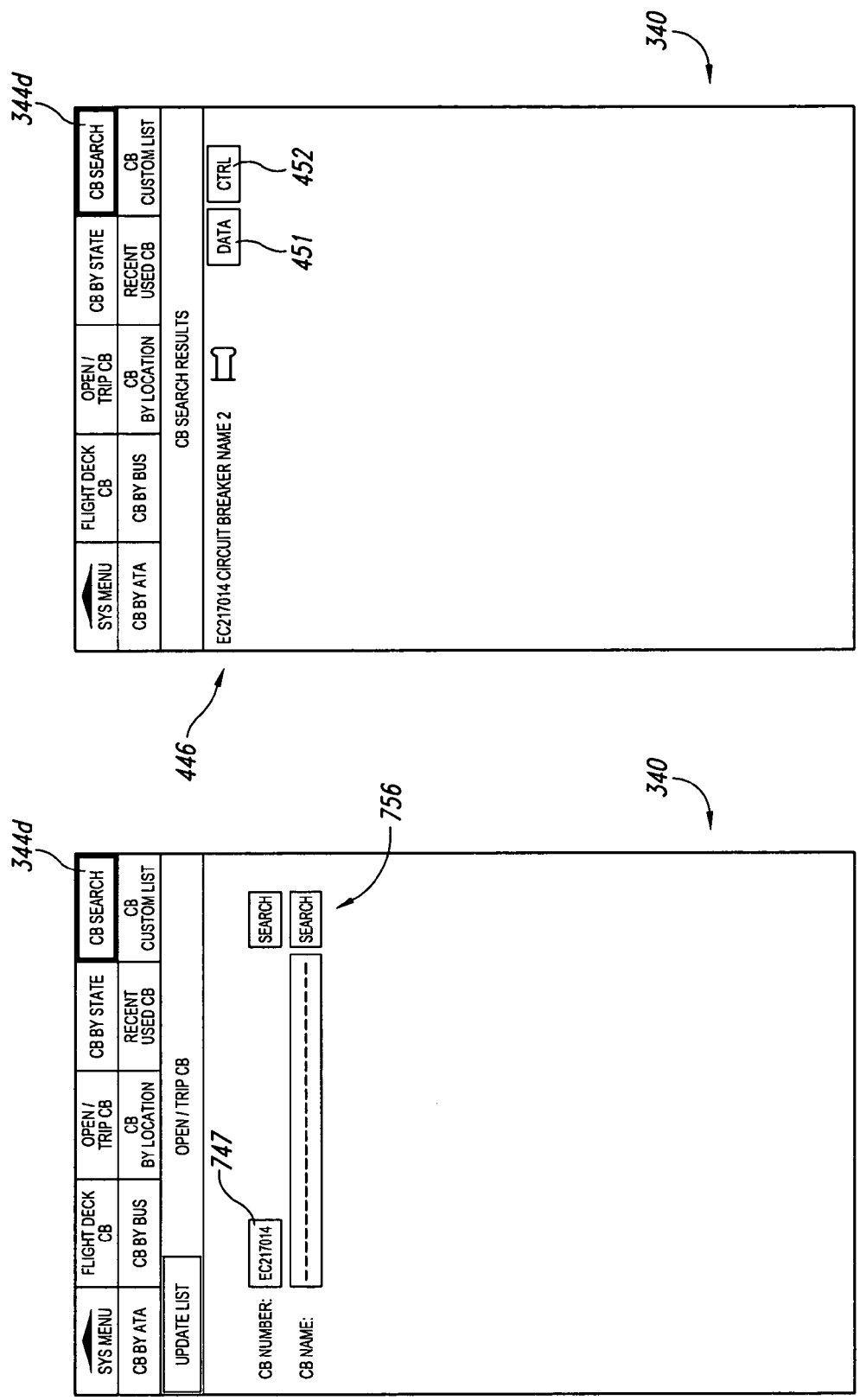

FIG. 7A illustrates the GUI 340 after the user has activated a CB search selector 344d. Accordingly, the GUI 340 presents a search query display 756. The user can search for a particular circuit breaker by circuit breaker number or by circuit breaker name. The user can also enter a keyword (rather than the entire circuit breaker name). For example, the user can enter "FAN," and the search will return all circuit breakers having "FAN" as part of the circuit breaker name. FIG. 7B illustrates the GUI 340 after the user has entered a circuit breaker identifier 747 at the search query display 756. FIG. 7C illustrates a search results display 757 that includes a circuit breaker display field 446 corresponding to the circuit breaker identified in response to the user's search request. If the system is unable to locate the requested circuit breaker, the GUI 340 can present a corresponding message 758, as indicated in FIG. 7D.

Figures 8B, 8C:
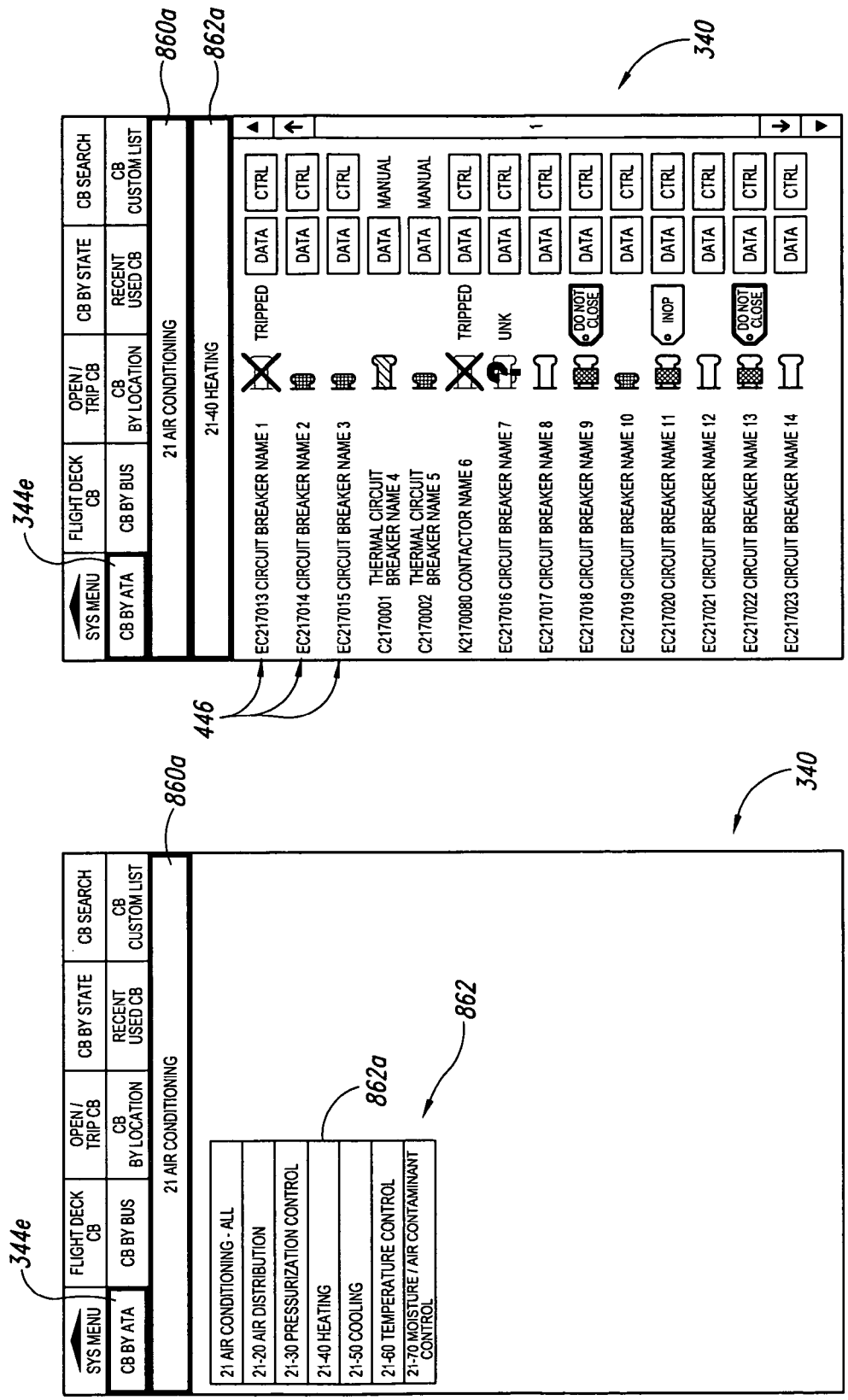

In FIG. 8A, the user has activated a CB by ATA selector 344e. Accordingly, the GUI 340 presents an ATA menu 859 identifying a list of aircraft systems, along with commonly accepted Airline Transport Association (ATA) identifying numbers. Each system can have a corresponding ATA selector 860, (e.g., ATA selector 860a corresponds to ATA category 21: air conditioning/pressurization). FIG. 8B illustrates the GUI 340 after the operator has activated the ATA selector 860a. In one aspect of this embodiment, the selector 860a can change shape and configuration to indicate that it has been selected, and the GUI 340 can then present a subsystem menu 861. The subsystem menu 861 can include a list of subsystem selectors 862, each of which corresponds to one of the subsystems associated with the system identified by the ATA selector 860a. One of the subsystem selectors 862 can include a heating subsystem selector 862a. FIG. 8C illustrates the GUI 340 after the user has activated the subsystem selector 862a. Now the GUI 340 presents a list of circuit breaker display fields 446, each corresponding to a circuit breaker associated with the subsystem identified by the subsystem selector 862a.

Figures 9, 10A:
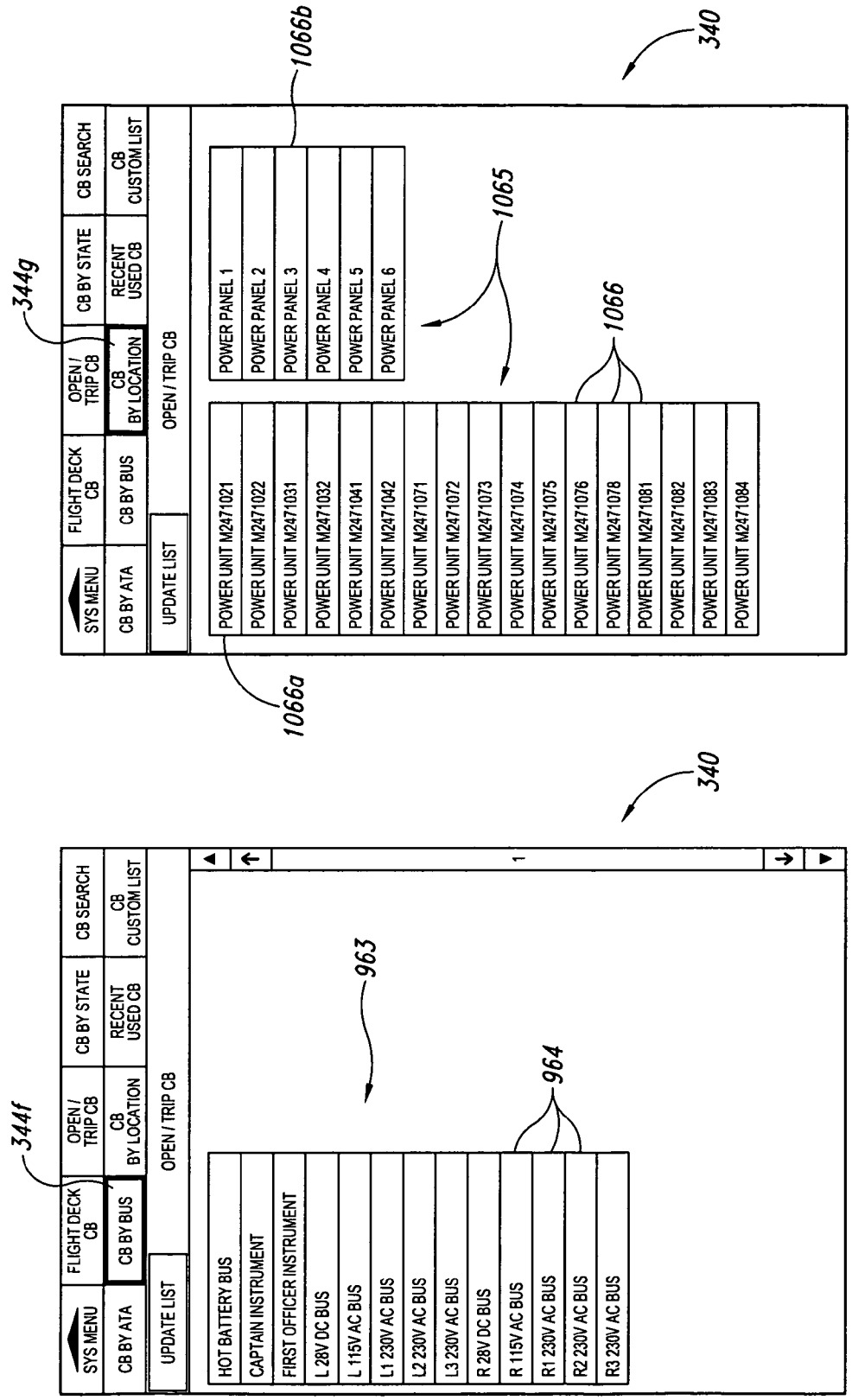
FIG. 9 illustrates a graphical user interface presenting a menu for selecting circuit breakers based on the electrical bus(es) to which the circuit breakers are coupled, in accordance with an embodiment of the invention.
FIGS. 10A-10E illustrate graphical user interfaces that allow a user to select circuit breakers by location in accordance with an embodiment of the invention.

FIG. 9 illustrates a further embodiment in which the user can activate a CB by bus selector 344f. The GUI 340 accordingly displays a bus menu 963, which includes multiple bus selectors 964. By activating any of the bus selectors 964, the user will be presented with a list of circuit breakers associated with that bus, and can control and/or obtain information for each circuit breaker, as described above.

Figures 10B, 10C:
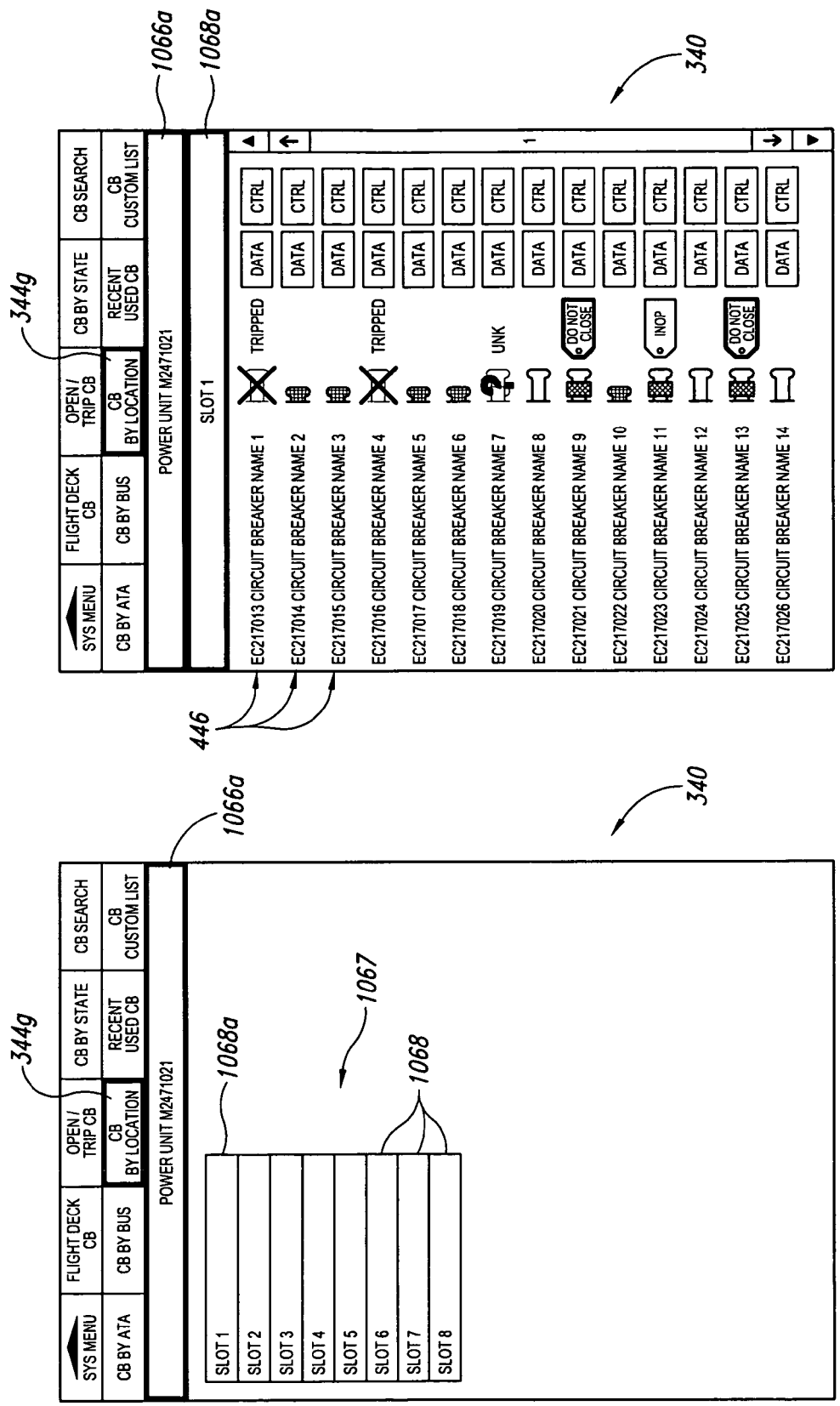
Figures 10D, 10E:
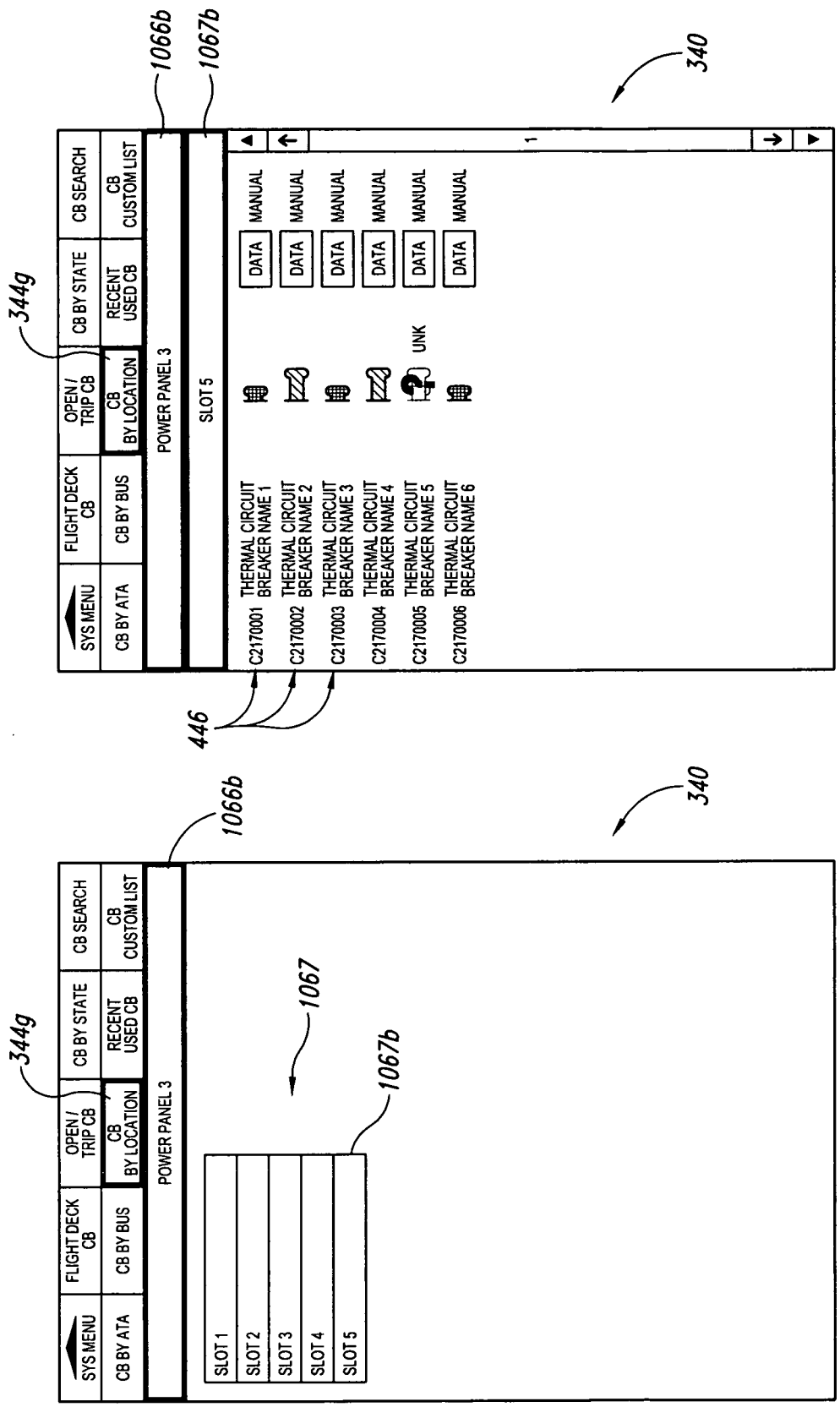

FIGS. 10A-10B illustrate another embodiment of the invention whereby the user can identify circuit breakers by location on the aircraft. The user can first activate a CB by location selector 344g to obtain a location menu 1065 that includes a list of location selectors 1066, including a first location selector 1066a and a second location selector 1066b. When the operator activates the first location selector 1066a, the GUI 340 presents a location submenu 1067, shown in FIG. 10B. The location submenu 1067 includes a listing of slot indicators 1068 identified with the first location. When the user activates a first slot selector 1068a, the GUI 340 presents a list of circuit breaker display fields 446 corresponding to that slot (as shown in FIG. 10C). FIGS. 10D and 10E illustrate the GUI 340 when the user activates the second location selector 1066b and a second slot selector 1067b, respectively.

FIGS. 11A-11H illustrate displays presented by the GUI 340 when the user activates a CB by state selector 344h. These Figures also depict the manner by which the user can change the state of the circuit breakers via the GUI 340. Any of the methods described below in connection with changing the state of the circuit breakers may also be applied to any of the circuit breakers or methods for accessing information corresponding to those circuit breakers described above with reference to FIGS. 3A-10E.

Figures 11A, 11B:
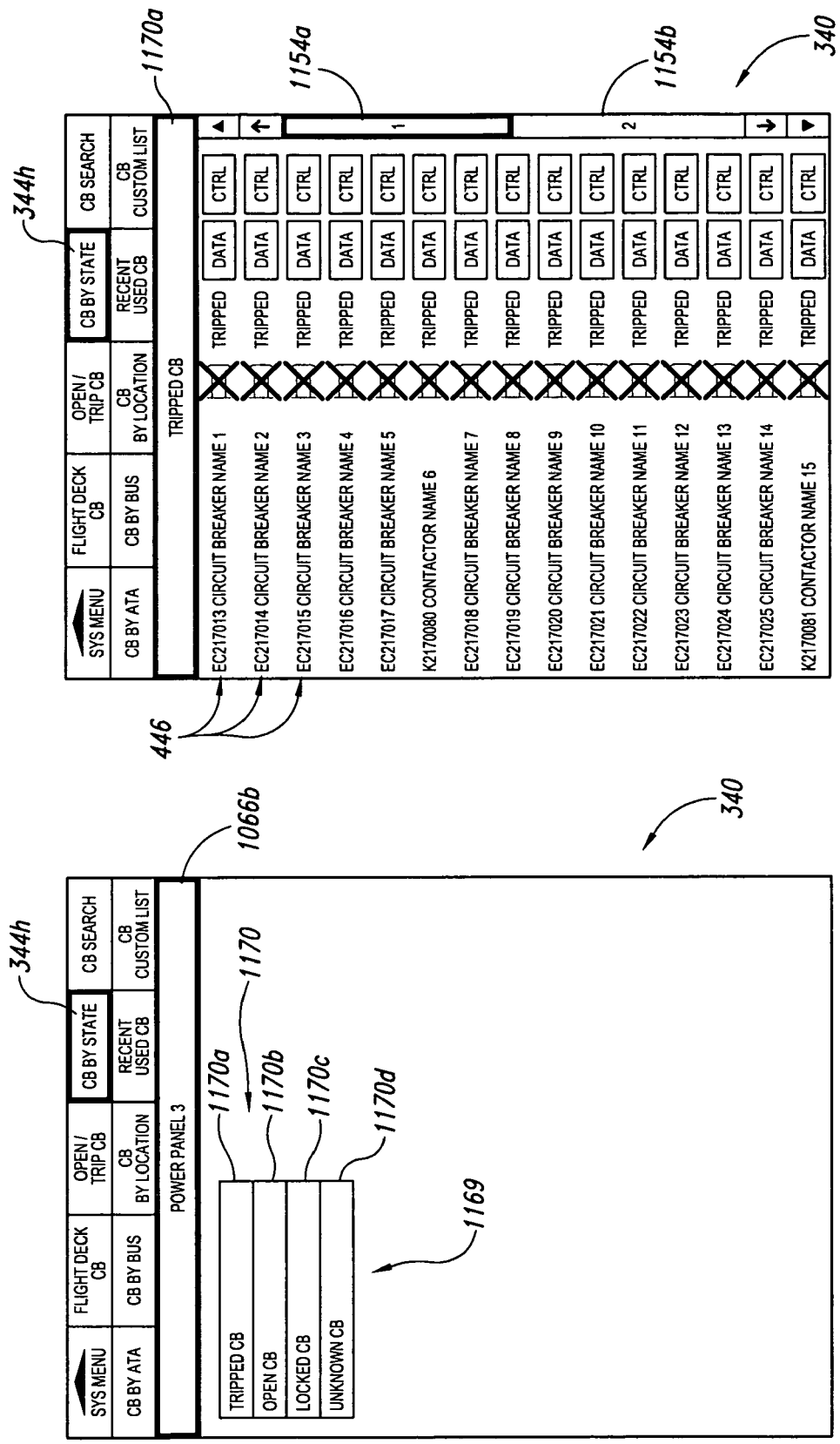
FIGS. 11A-11H illustrate graphical user interfaces that allow a user to select circuit breakers by state in accordance with an embodiment of the invention.
Figures 11C, 11D:
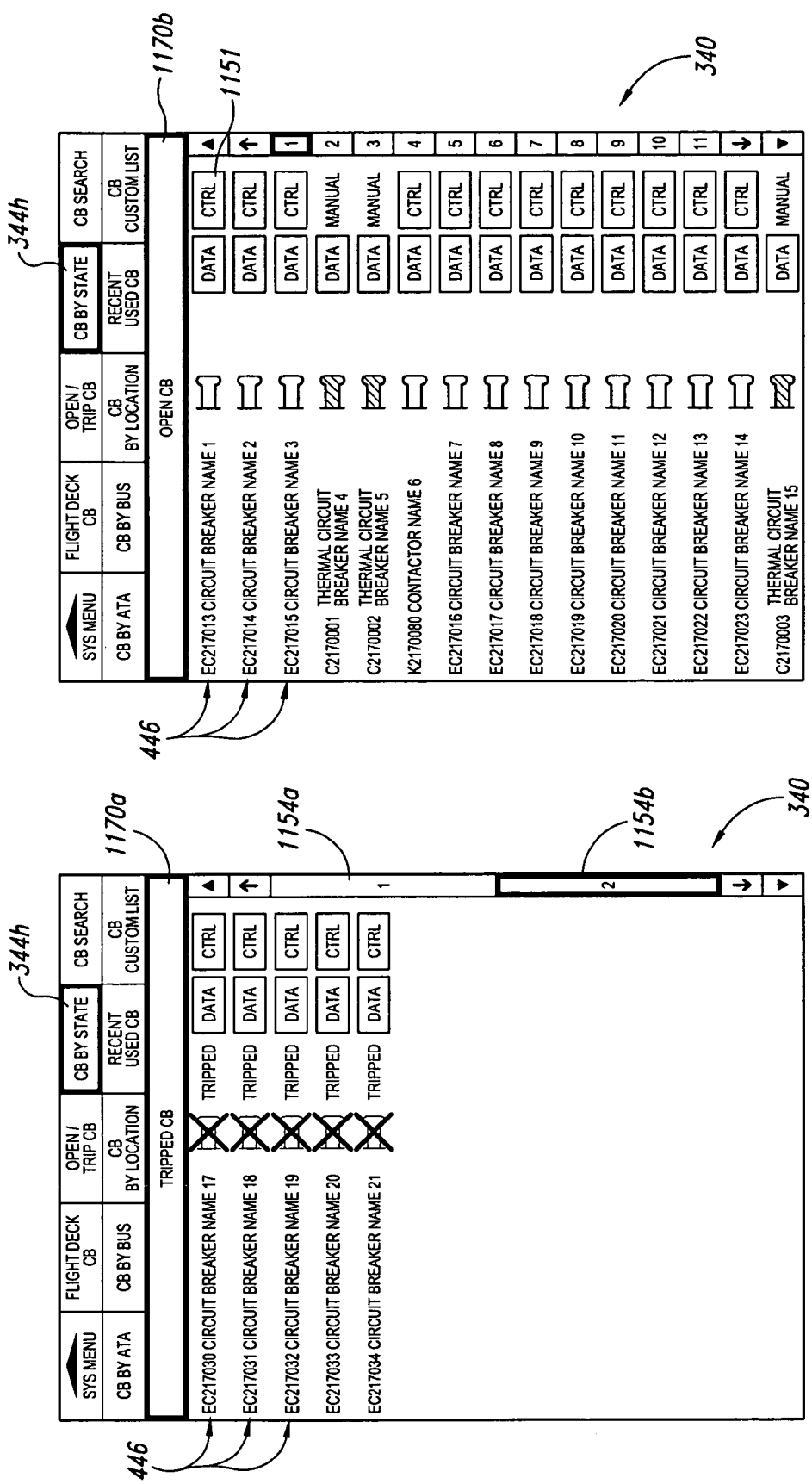
Figures 11E, 11F:
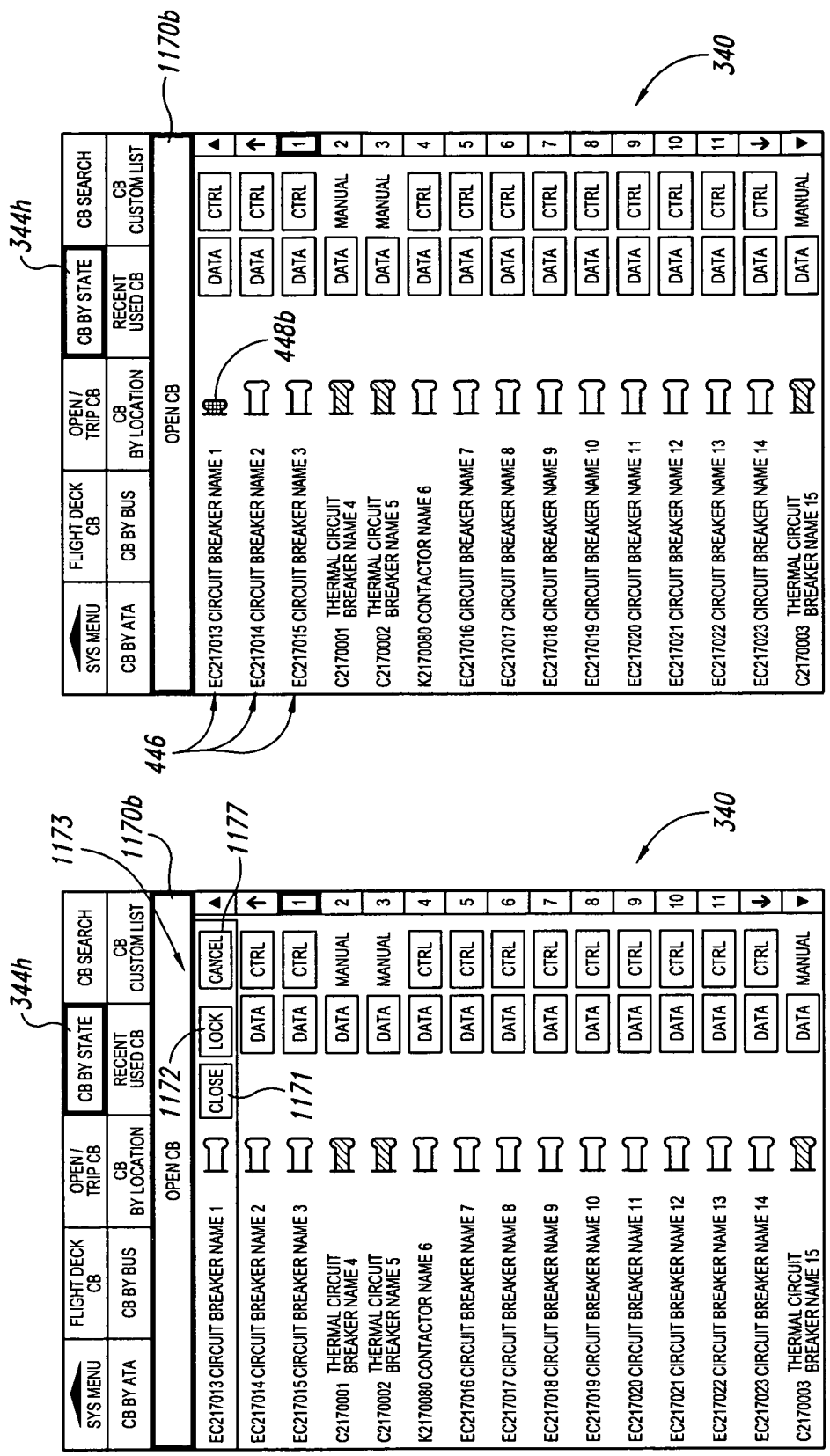

Beginning with FIG. 11A, when the user activates the CB by state indicator 344h, the GUI 340 presents a state menu 1169, which includes a list of state selectors 1170 (shown as state selectors 1170a-1170d). Each state selector corresponds to a circuit breaker state (e.g., tripped, opened, locked, and unknown, respectively). When the user activates the tripped circuit breaker selector 1170a, the GUI 340 presents a list of circuit breaker display fields 446 that identifies each of the tripped circuit breakers (FIG. 11B). In this particular embodiment, the list occupies two pages, as indicated by a first page selector 1154a and a second page selector 1154b. When the user activates the second page selector 1154b, the circuit breaker display fields 446 associated with the second page are presented, as shown in FIG. 11C. The page selectors 1154 and/or arrow keys can be used to move among the pages.

Referring now to FIG. 11D, the user has activated the open circuit breaker state selector 1170b to present a list of circuit breaker display fields 446 corresponding to open circuit breakers. When the user activates the control selector 1151 associated with the first listed circuit breaker, the GUI 340 presents a control menu 1173, shown in FIG. 11E. The control menu 1173 can include a close selector 1171, a lock selector 1172, and a cancel selector 1177. If the user does not wish to change the state of the identified circuit breaker, the user can activate the cancel selector 1177. If the user wishes to close the identified circuit breaker, the user can activate the close selector 1171. Accordingly, the GUI 340 will automatically update to present a closed status indicator 448b adjacent to the identifier 446 for that circuit breaker (see FIG. 11F).

Figure 11H:
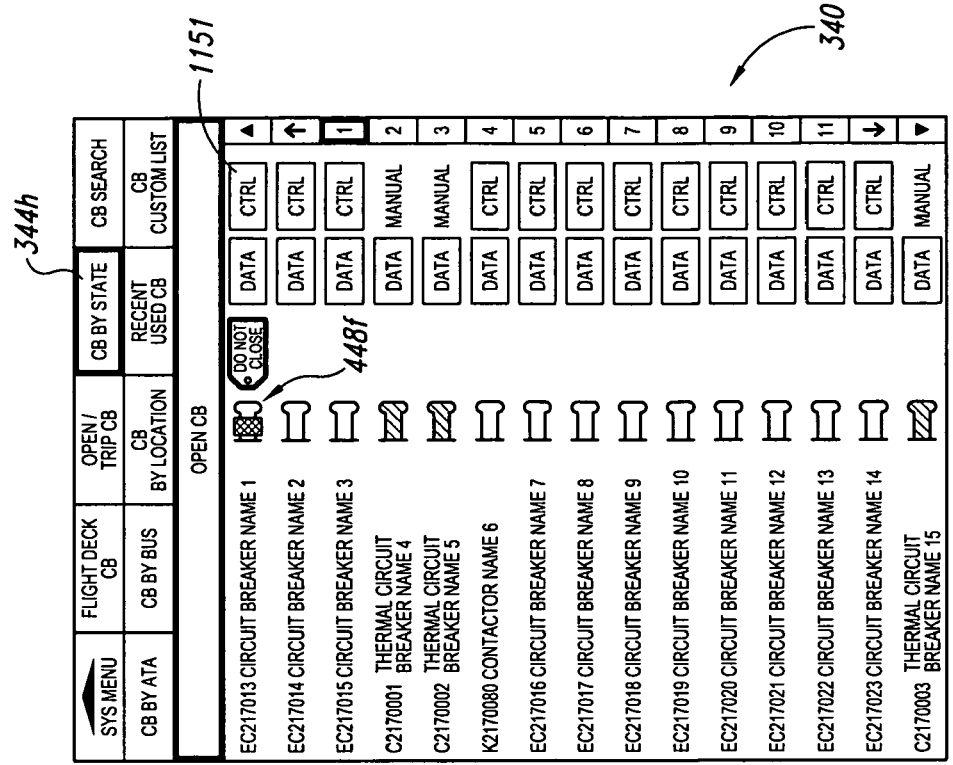
Figure 11G:
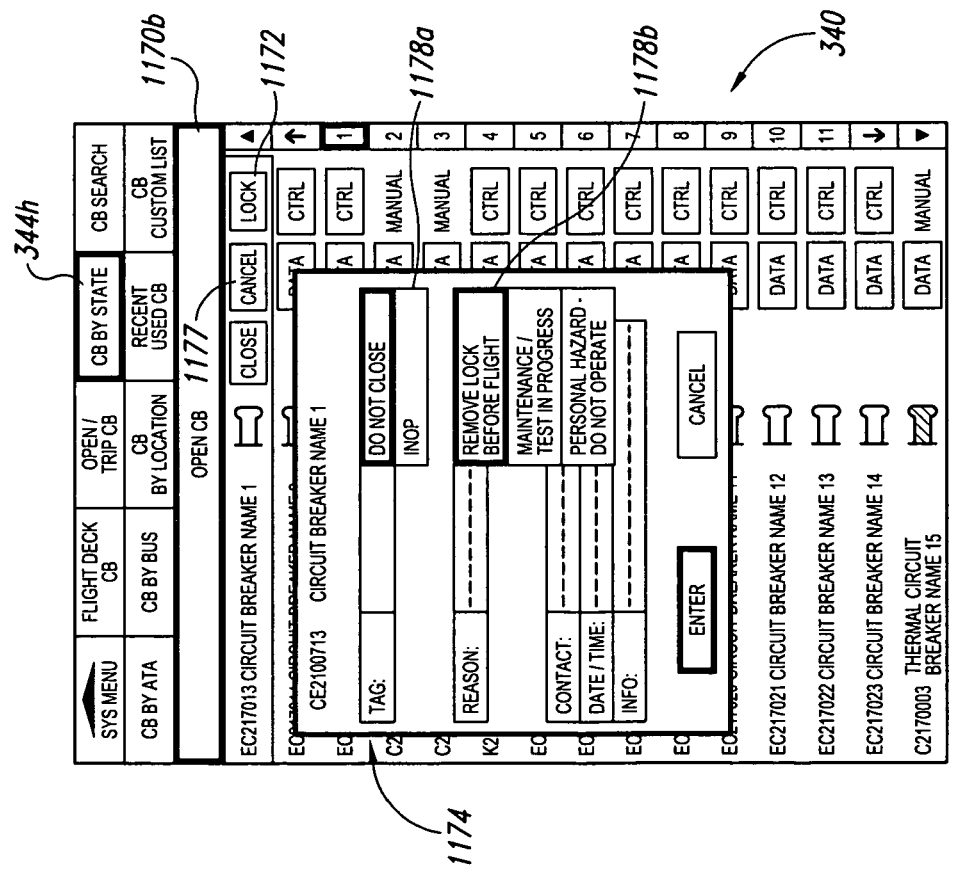

FIG. 11G illustrates the GUI 340 when the user activates the lock selector 1172. The GUI 340 presents a lock menu 1174 which allows the user not only to lock the circuit breaker (e.g., prevent the circuit breaker from changing state) but also to provide textual information corresponding to instructions associated with the lock. The textual identifiers can be selected from additional dropdown menus 1178a, 1178b, or can be input manually by the operator. As shown in FIG. 11H, once the operator has locked the circuit breaker, the GUI 340 updates to present a locked indicator 448f adjacent to the corresponding circuit breaker identifier.

One feature of an embodiment shown in FIG. 11G (which is applicable to other aspects of the GUI 340 as well), is that multiple windows, which may overlay each other, can have active selectors located at different X-Y coordinates. In another embodiment, active selectors may be overlaid, but the effect of such an overlay can be mitigated. For example, the cancel selector 1177 shown in FIG. 11E may in some cases overlay a data selector 452 on an underlying display. A "double-click" on the cancel selector 1177 would not result in any control function being activated, but instead additional data corresponding to the circuit breaker would be displayed. Accordingly, the layout of the GUI 340 can include a consideration of the functions of different buttons and resulting actions from the overlaid buttons as another method to mitigate un-intended control (e.g., an open/close change of state) of selected circuit breakers. In another aspect of this embodiment, subsequently presented windows can be offset from (rather than overlaid on) earlier presented windows. Any of these arrangements can prevent an operator, who inadvertently "double-clicks" on one button, from (a) activating a selector that pops up on a subsequently presented window, or (b) activating a selector that takes any action on the circuit breaker.

In a particular embodiment, the user can apply the same action to multiple circuit breakers simultaneously. For example, the user can activate multiple control selectors 1151 (e.g., control sectors 1151 for multiple circuit breakers) and, with a single key stroke or mouse click, change the states of all circuit breakers having activated control selectors 1151. In further embodiments, the user can activate all the control selectors on a given page or in a given list, also with a single key stroke or mouse click.

Figures 12A, 12B:
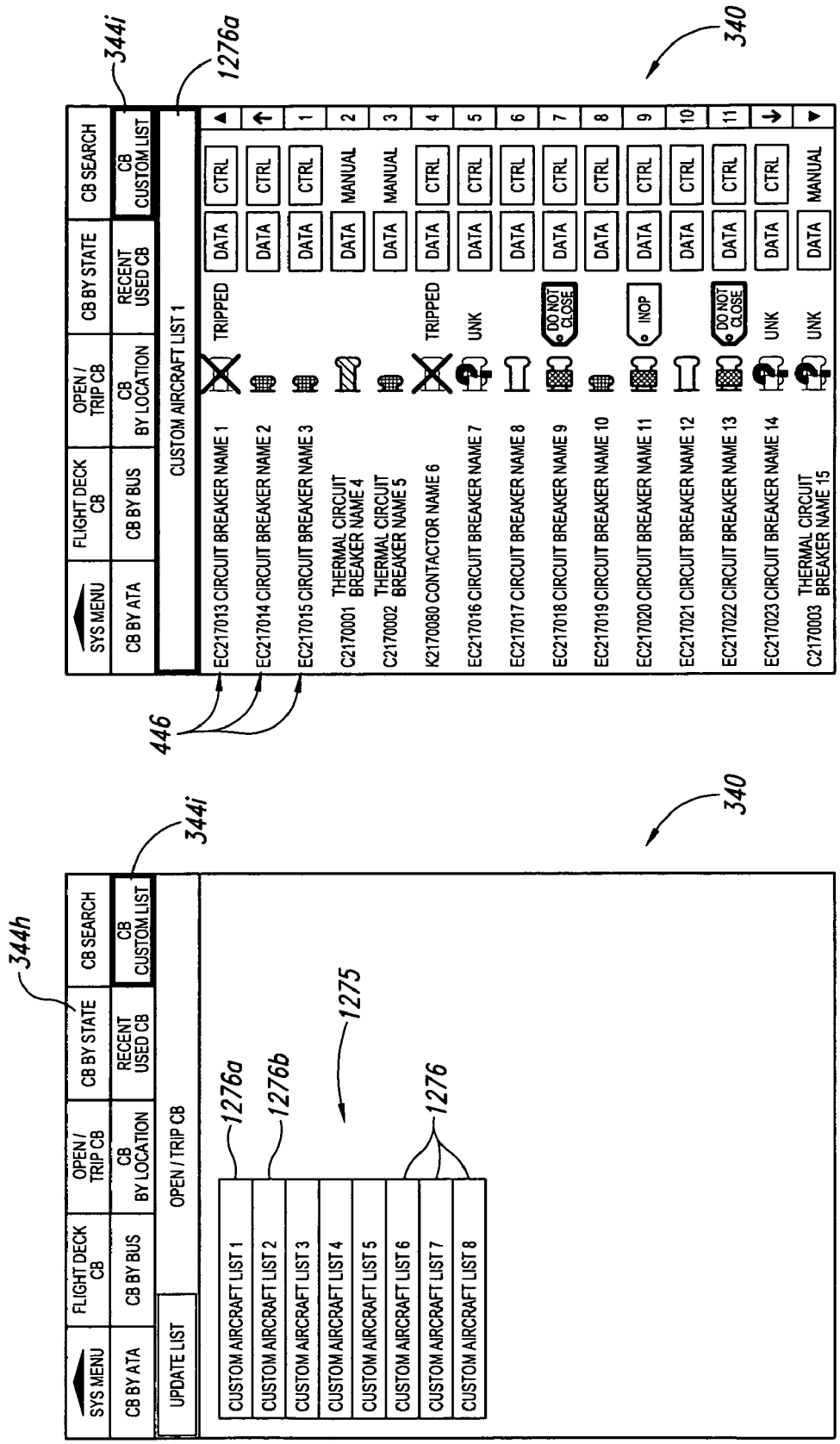
FIGS. 12A-12B illustrate graphical user interfaces presenting custom lists of circuit breakers in accordance with an embodiment of the invention.

In still further embodiments, the aircraft operator (e.g., the aircraft owner) can formulate a custom list of circuit breakers that is different from any of the lists identified above. For example, if a particular aircraft operator has a specific list of circuit breakers that are to be opened or closed at a specific time, or upon completing a particular sequence of events, the operator can group those circuit breakers in a custom list, with or without the assistance of the aircraft manufacturer. FIG. 12A illustrates the GUI 340 after the operator has activated the CB custom list selector 344i. Accordingly, the GUI 340 presents a custom menu 1275 that includes custom list selectors 1276, e.g., a first list selector 1276a and a second list selector 1276b. When the operator activates the first list selector 1276a (as shown in FIG. 12B), the GUI 340 can display a list of circuit breaker display fields 446 corresponding to the circuit breakers identified by the custom-made list. The custom list can include a dynamic list, e.g., the members of the list can be selected (or de-selected) by the user and/or membership on the list can depend on user-selected criteria.

FIG. 13 illustrates a process 1300 for presenting and handling information corresponding to circuit breakers, for example, circuit breakers on board an aircraft. In process portion 1301, the process 1300 can include receiving information corresponding to the states of multiple electronic circuit breakers. In process portion 1302, the information corresponding to the states of the electronic circuit breakers can be displayed in a menu-driven format at a GUI. In process portion 1303, the process 1300 can include presenting a pointer at the GUI. In response to a first command from a user, the process can include moving the pointer at the GUI (process portion 1304). In response to a second command from the user, the process 1300 can include selecting an icon or other representation aligned with the pointer, with the icon corresponding to a selected one of the electronic circuit breakers. The first and second commands can correspond to commands received via a mouse, computer keyboard, or other input device. In process portion 1306, a third command from the user is received. The third command can correspond to a request for an action regarding the selected circuit breaker. In response to the third command, the process can include handling additional information corresponding to the electronic circuit breaker, or directing the electronic circuit breaker to change state, or both. Handling additional information can include (but is not limited to) presenting information, taking no further action, modifying information, and/or assigning a circuit breaker to another list of circuit breakers.

One feature of an embodiment of the systems described above with reference to FIGS. 2-13 is that it can include symbolic and/or textual identifiers that can be color coded and that correspond to the state of each circuit breaker selected by the user. This arrangement can more immediately and effectively convey to the user the state of each circuit breaker than can some existing systems, which may rely only on color coding or text to convey this information.

Another feature of an embodiment of the systems described above with reference to FIGS. 2-13 is that the GUI can present information associated with manually-operable circuit breakers (e.g., thermal circuit breakers) even though the states of these circuit breakers cannot be manipulated remotely via the GUI. An advantage of this feature is that it can provide information on all system circuit breakers at a single location, whether or not the circuit breakers are remotely manipulable. The system can also clearly distinguish between circuit breakers that are remotely manipulable and those that are not, so that the operator can quickly take the necessary steps to change the states of the circuit breakers, if so desired.

Another feature of an embodiment of the systems described above with reference to FIGS. 2-13 is that the user can select circuit breakers from nested, menu-driven lists, using a pointer presented at a GUI. This is unlike some conventional systems, in which the operator is limited to using line select keys and toggle keys, as described above with reference to FIG. 1. An advantage of this feature is that it can be easier and more intuitive for the user to operate. Another advantage is that it can provide additional versatility for the operator. For example, as described above with reference to FIGS. 12A-12B, the user can assemble a custom-made list of circuit breakers to suit specific needs. The user can also identify circuit breakers by, among other things, location in the aircraft, aircraft system, circuit breaker state, and how recently the circuit breaker has been manipulated.

Yet another feature of embodiments of the systems described above with reference to FIGS. 2-13 is that the circuit breakers can be configured to have a particular state, or to change state, without power being applied to the circuits they control, so long as the system that controls the GUI and associated memory devices is powered up. An advantage of this arrangement is that the states of the circuit breakers can be accessed and/or changed without powering up the entire aircraft. When the aircraft is powered up, any changes made are automatically effective.

Still another feature of embodiments of the systems described above with reference to FIGS. 2-13 is that the GUI can be presented at any of a wide variety of display devices, including the MFDs, but also including laptops, ground-based computers and any other compatible display device. Accordingly, and unlike the display shown in FIG. 1, the GUI can be arranged and changed independently of line select keys and other hardware features.

Still another feature of embodiments of the systems described above with reference to FIGS. 2-13 is that the user can provide explanatory information when changing a circuit breaker state. For example, as described above with reference to FIG. 11G, the user can not only lock out a circuit breaker from further changes, but can also indicate the reason for the lockout and other pertinent information (for example, when the lockout should be removed).

As described above with reference to FIG. 3A, the processor 321 can be coupled to other computers or systems and/or other displays. For example, the processor 321 can be coupled to an automatic electronic maintenance log. Accordingly, when an operator makes a change to the state of any of any circuit breaker, that change can be entered automatically into a maintenance log and can be available for review by maintenance personnel and/or anyone else qualified to access the log. This link can also operate in the opposite sense. For example, maintenance personnel can access the circuit breaker GUI 340 from an automatic maintenance log. Accordingly, the maintenance personnel can scroll through the maintenance log and, when they identify a circuit breaker for which they want additional information, can access the corresponding GUI 340. Once they have access to the GUI 340, they can access other circuit breakers (e.g., other circuit breakers having the same state, or other circuit breakers associated with the same system, bus, subsystem, or other circuit breakers that were manipulated around the same time, or other circuit breakers having some other relationship to the identified circuit breaker).

Still another advantage of the foregoing feature is that the GUI 340 can be presented at displays other than the multi-function displays located at the aircraft flight deck. For example, the information provided at the display medium 323 (FIG. 3A) can also be provided at other displays located throughout the aircraft, either via the data bus 322, or via another data bus. In a particular example, a maintenance worker accessing a circuit breaker panel in a remote portion of the aircraft can plug a laptop computer, palmtop computer, ground test cart, or other computer device into the bus and can access any or all of the circuit breaker information described above, without having to go to the flight deck. Personnel can also access the system via a wireless link. An advantage of this arrangement is that it can reduce the amount of time required by maintenance personnel to service the aircraft in which this system is installed.

Still another feature of embodiments of the systems and methods described above with reference to FIGS. 2-13 is that multiple circuit breakers can be changed in state with a reduced amount of effort. For example, if the user instructs the system to present a list of all circuit breakers that have been tripped, the operator can activate a "close all selector" or can activate selected control selectors to close multiple tripped circuit breakers simultaneously. This can reduce the amount of time required to apply the same action to multiple circuit breakers, which can in turn increase the efficiency with which the aircraft is operated and maintained.

Yet another feature of embodiments of the systems and methods described above is that they can support the use of multiple display/input ports (e.g., laptop computers) at multiple locations on-board and/or off-board the aircraft. This arrangement may be more versatile than existing CDUs, which are typically available only at the flight deck.

In further embodiments, systems and methods generally similar to those described above can be applied to other systems. For example, the systems and methods can be installed on vehicles or devices other than aircraft that have multiple circuit breakers. The GUIs described above and shown in the Figures are representative of suitable GUIs, but they can differ in appearance and/or operation in other embodiments.

FIGS. 14A-14G illustrate GUIs configured to present and receive information in accordance with further embodiments of the invention. Certain aspects of the GUIs shown in FIGS. 14A-14G are generally similar to those described above, and some of the differences between these GUIs and the foregoing GUIs are highlighted below.

Figure 14C:
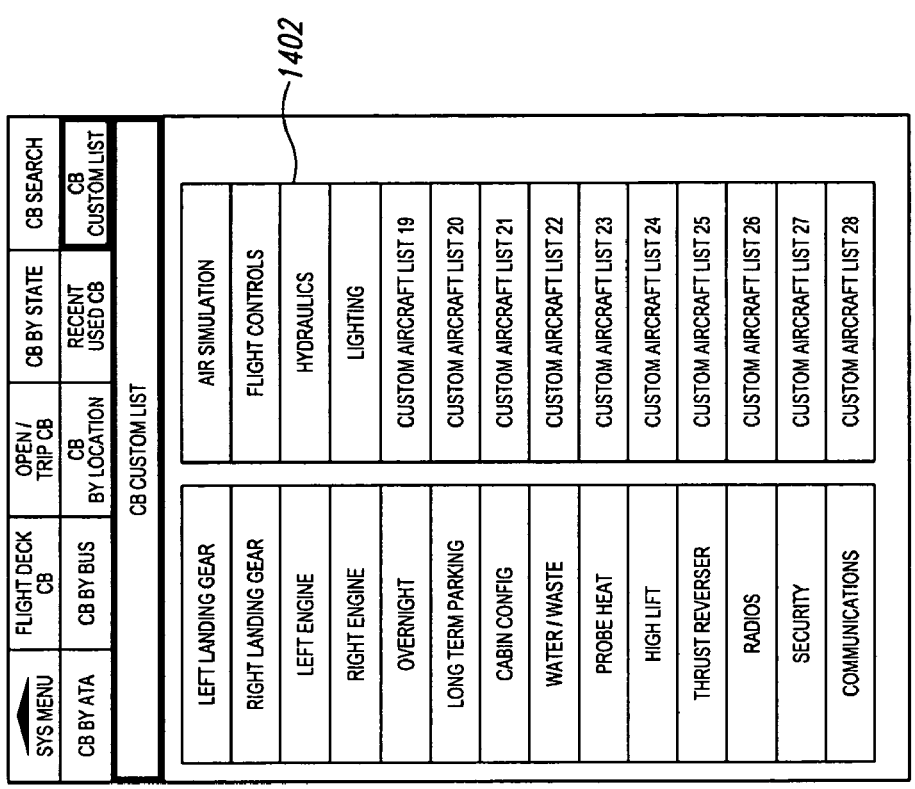
Figure 14B:
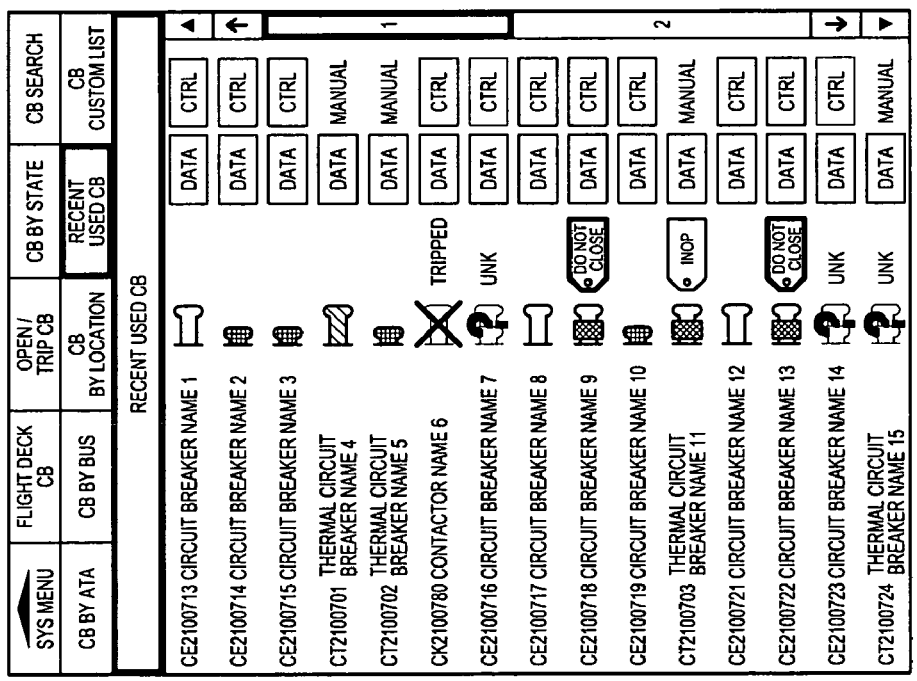

FIG. 14A illustrates a message 1401 identifying a hazard associated with a particular circuit breaker. This message can appear in red or another warning color to highlight the state of the circuit breaker to the viewer. FIG. 14B illustrates the menu presented when a user activates a "recent used CB" selector. In one aspect of this embodiment, the user need not necessarily change the states of the listed circuit breakers in order to have the circuit breakers added to the recently used circuit breaker list. For example, the user can select a circuit breaker to be added to the recent used CB list in a manner generally similar to that associated with tagging a favorite website, without necessarily taking any other action associated with that circuit breaker.

Figures 14D, 14E:
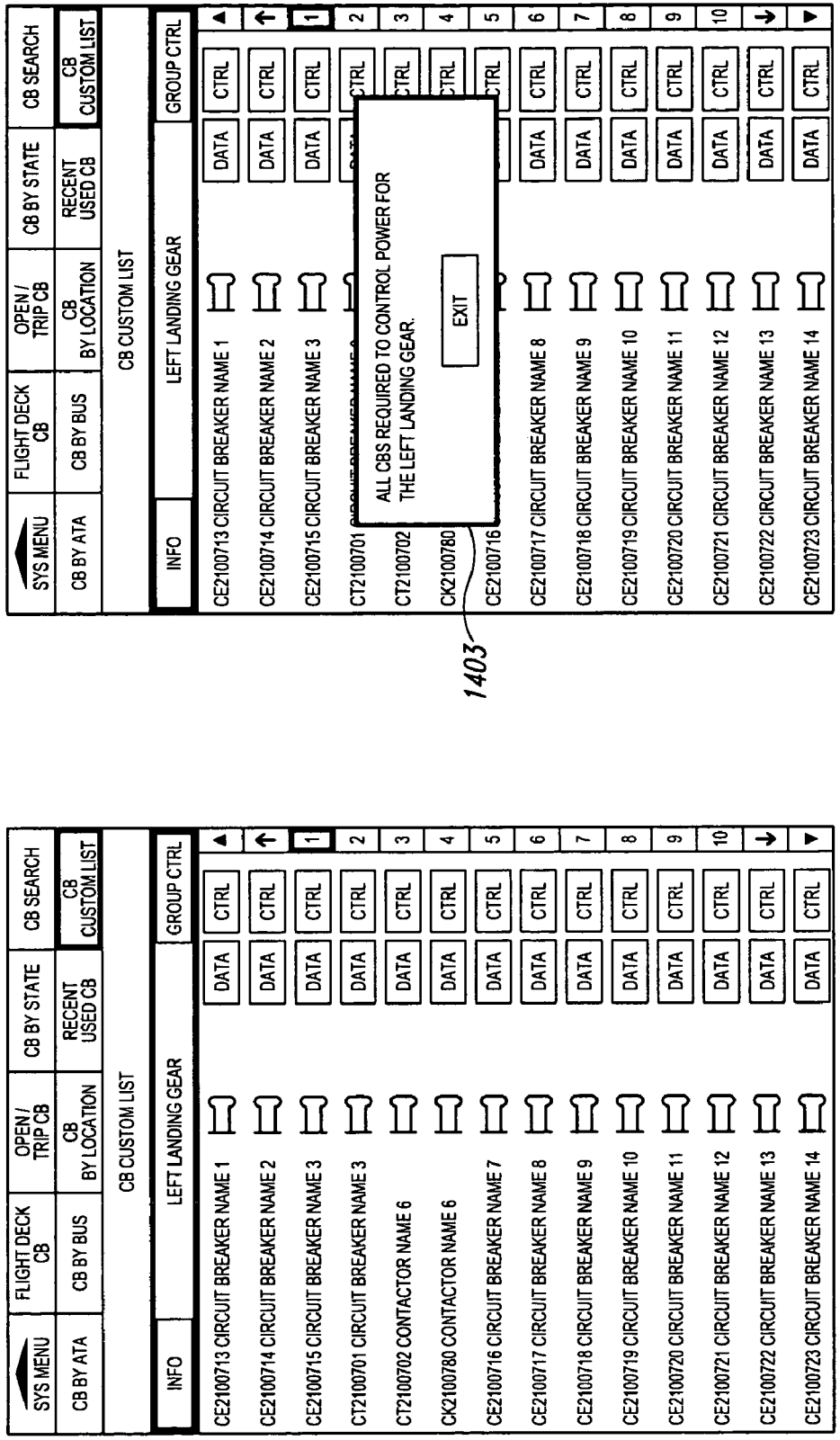
Figure 14G:
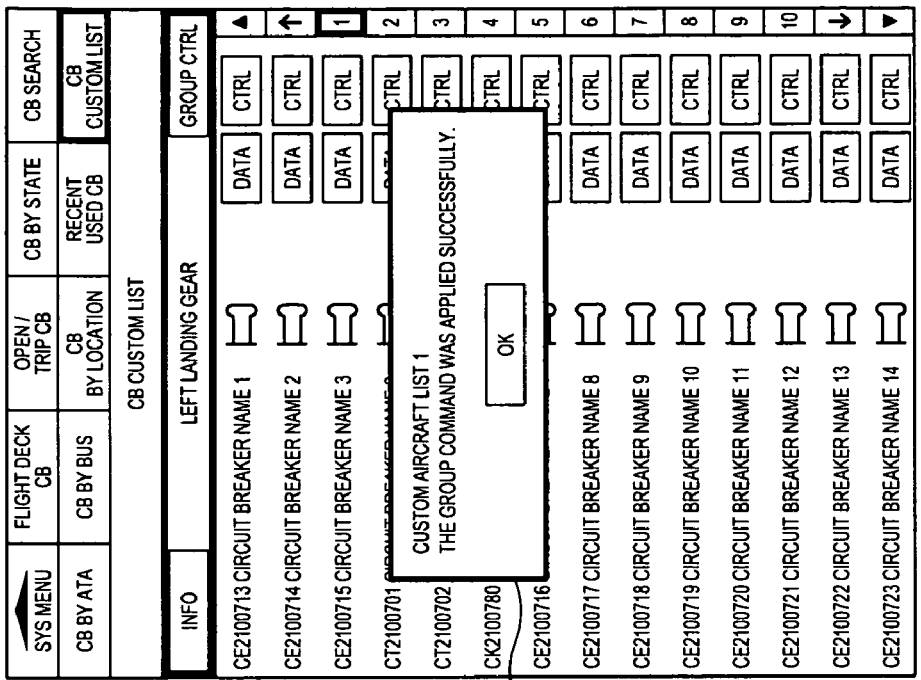
Figure 14F:
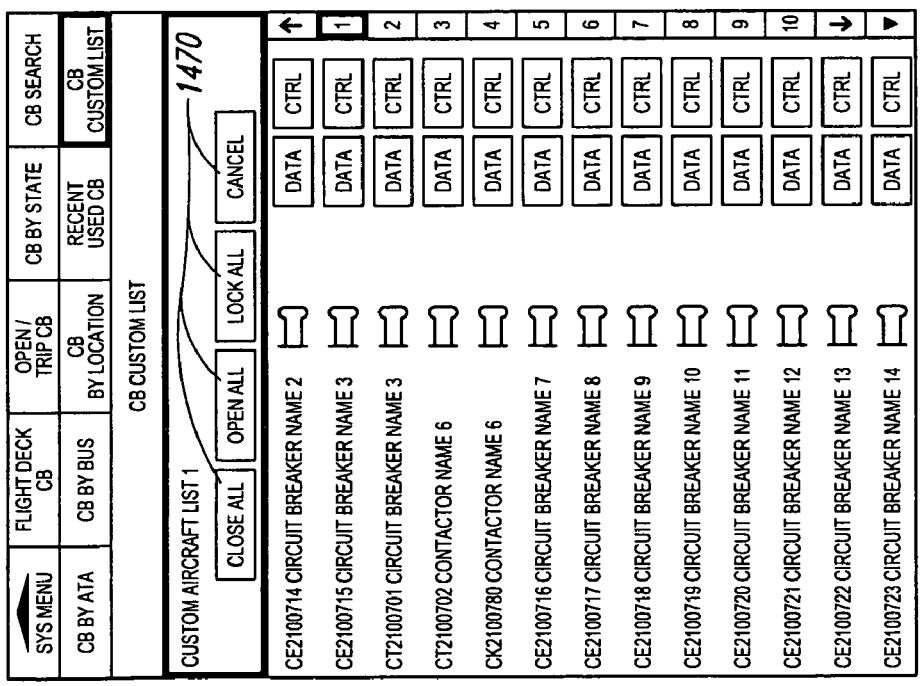

FIGS. 14C-14G illustrate sample custom lists which may be requested by a particular airline operator. For example, FIG. 4C illustrates a table 1402 of customized lists, and FIG. 14D illustrates information presented when one of the lists (e.g., Left Landing Gear) is selected. FIG. 14E illustrates a display 1403 that identifies how the circuit breakers associated with a particular list are linked. For example, as shown in FIG. 14E, the identified circuit breaker custom list includes all circuit breakers required to control power for the left landing gear. FIG. 14F illustrates selectors 1470 that can be used to change the state of multiple circuit breakers with a single action. For example, by clicking a "close all", "open all", or "lock all" selector, the user can take the corresponding action for all the identified circuit breakers. With the "cancel" selector, the user can cancel a particular selection for all identified circuit breakers. FIG. 14G illustrates a message 1471 confirming successful application of the group command. Accordingly, the user can call up a defined list of circuit breakers that the operator can use to activate multiple circuit breakers simultaneously. This list can be created by the operator or selected from an electronic library and downloaded to the airplane. A list may exist for each maintenance function, which allows the operator to increase efficiency. These lists may be downloaded and/or deleted from the airplane, depending on the functions that the operator wants to perform for day-to-day maintenance, or for a scheduled maintenance activity. This feature allows numerous lists to be stored at one time. The operator can close all circuit breakers, open all circuit breakers, or apply locks to circuit breakers simultaneously from the custom list as shown in FIG. 14F. Detailed descriptions of each custom listing can also be programmed in by the operator and viewed on the aircraft by selecting the appropriate menu selection shown in FIG. 14E. This user-friendly feature can provide an operator (who may have limited knowledge) with enough information to use and/or understand the function of a particular custom list.

From the foregoing, it will be appreciated that specific embodiments of the invention have been described herein for purposes of illustration, but that various modifications may be made without deviating from the spirit and scope of the invention. For example, access to the circuit breakers can be password-protected to provide for additional security. The icons and menu format shown in the Figures are representative embodiments of the invention, and may have other configurations in other embodiments. For example, the circuit breaker icons may have hexagonal shapes. The display can include other selectors, for example a "help" selector that provides further instructions when selected. Links (e.g., hyperlinks) can be provided to electronically connect the user with maintenance manuals and/or crew manuals. The user can select different colors for different portions of the icons (e.g., a different color for the "collar" that surrounds a locked circuit breaker). Different colors can have different connotations (e.g., one color indicates a maintenance action or item, and another color indicates an inoperative or deactivated system.

Aspects of the invention described in the context of particular embodiments may be combined or eliminated in other embodiments. For example, aspects of the arrangements shown in FIGS. 14A-14Z may be combined with the arrangements shown in earlier Figures. Information (e.g., circuit breaker lists) can be assembled off-board the aircraft and then downloaded to particular aircraft as needed. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A method for handling circuit breaker information and/or state changes, comprising:
   receiving information corresponding to the states of multiple electronic circuit breakers;
   displaying the information corresponding to the states of the electronic circuit breakers in a menu-driven format at a graphical user interface;
   presenting a pointer at the graphical user interface;
   in response to a first command from a user, moving the pointer at the graphical user interface;
   in response to a second command from the user, selecting an icon aligned with the pointer, the icon corresponding to a selected one of the electronic circuit breakers;
   receiving a third command from the user; and
   in response to the third command, handling additional information corresponding to the electronic circuit breaker, or directing the electronic circuit breaker to change state, or both, wherein handling additional information includes presenting the information corresponding to the states of the electronic circuit breakers by displaying non-textual, graphical representations of the states.

2. The method of claim 1, further comprising displaying information corresponding to non-electronic circuit breakers.

3. The method of claim 1, wherein displaying information corresponding to the states of the circuit breakers includes displaying information corresponding to a locked state of the circuit breaker, along with instructions corresponding to the locked state.

4. The method of claim 1, further comprising providing an electronic link to at least one of a computer-based maintenance manual and a computer-based crew manual.

5. The method of claim 1 wherein displaying information includes displaying information arranged by the states of the circuit breakers.

6. The method of claim 1 wherein displaying information includes displaying information arranged by how recently information corresponding to the circuit breakers was accessed.

7. The method of example 1 wherein displaying information includes displaying information arranged by how recently the states of the circuit breakers were changed.

8. The method of claim 1, further comprising searching for a requested circuit breaker by a keyword corresponding to the circuit breaker.

9. The method of claim 1, further comprising providing a warning message when an instruction from the user is to unlock a locked circuit breaker.

10. The method of claim 1, further comprising receiving an instruction to lock a circuit breaker from further state changes when the circuit breaker is unpowered.

11. The method of claim 1, further comprising:
receiving an instruction to lock a circuit breaker from further state changes; and
receiving an instruction to associate a textual explanation with the locked circuit breaker.

12. The method of claim 1 wherein displaying the information corresponding to the states of the electronic circuit breakers includes displaying first information and first user-selectable input icons at a first location of the graphical user interface, and wherein handling additional information includes:
presenting the additional information to overlay the first information, wherein the additional information includes additional user-selectable input icons that do not overlay the first input icons.

13. The method of claim 1 wherein directing the electronic circuit breaker to change state includes directing the electronic circuit breaker to change state while power is not applied to the circuit controlled by the electronic circuit breaker.

14. The method of claim 1 wherein directing an electronic circuit breaker to change state includes directing multiple electronic circuit breakers to change state in an at least approximately simultaneous manner.

15. The method of claim 1, further comprising providing a dynamic list of circuit breakers, with the identity of circuit breakers on the dynamic list changing in response to a user input.

16. The method of claim 1, further comprising:
receiving input from the user to correlate selected electronic circuit breakers with each other; and
presenting information for the selected electronic circuit breakers together.

17. An aircraft, comprising:
a fuselage that includes a flight deck;
a wing coupled to the fuselage;
a plurality of electrical systems having at least a corresponding plurality of circuit breakers, including at least one electronic circuit breaker; and
a computer operatively coupled to the circuit breakers, the computer including:
a receiver configured to receive information corresponding at least in part to the states of multiple electronic circuit breakers;
a display medium configured to display the information corresponding at least in part to the states of the electronic circuit breakers in a menu-driven format at a graphical user interface so as to include first information and first user-selectable input icons at a first location of the graphical user interface; and
a computer-readable medium configured to:
move a pointer at the graphical user interface in response to a first command from a user;
select an icon aligned with the pointer in response to a second command from the user, the icon corresponding to a selected one of the electronic circuit breakers; and
direct the electronic circuit breaker to change state, or handle additional information corresponding to the circuit breaker, or both, in response to a third command from the user, wherein the computer-readable medium is configured to display the additional information so as to overlay the first information, and wherein the additional information includes additional user-selectable input icons that do not overlay the first input icons.

18. The aircraft of claim 17 wherein the computer-readable medium is configured to display information arranged by the states of the circuit breakers.

19. The aircraft of claim 17 wherein the computer-readable medium is configured to search for a requested circuit breaker by a keyword corresponding to the circuit breaker.

20. The aircraft of claim 17 wherein the computer-readable medium is configured to direct multiple electronic circuit breakers to change state in an at least approximately simultaneous manner.

21. A method for handling circuit breaker information and/or state changes, comprising:
receiving information corresponding to the states of multiple electronic circuit breakers;
displaying the information corresponding to the states of the electronic circuit breakers in a menu-driven format at a graphical user interface;
presenting a pointer at the graphical user interface;
in response to a first command from a user, moving the pointer at the graphical user interface;
in response to a second command from the user, selecting an icon aligned with the pointer, the icon corresponding to a selected one of the electronic circuit breakers;
receiving a third command from the user;
in response to the third command, handling additional information corresponding to the electronic circuit breaker, or directing the electronic circuit breaker to change state, or both; and
displaying information corresponding to non-electronic circuit breakers.

22. A method for handling circuit breaker information and/or state changes, comprising:
receiving information corresponding to the states of multiple electronic circuit breakers;
displaying the information corresponding to the states of the electronic circuit breakers in a menu-driven format at a graphical user interface;
presenting a pointer at the graphical user interface;
in response to a first command from a user, moving the pointer at the graphical user interface;
in response to a second command from the user, selecting an icon aligned with the pointer, the icon corresponding to a selected one of the electronic circuit breakers;
receiving a third command from the user;

in response to the third command, handling additional information corresponding to the electronic circuit breaker, or directing the electronic circuit breaker to change state, or both; and providing an electronic link to at least one of a computer-based maintenance manual and a computer-based crew manual.

23. A method for handling circuit breaker information and/or state changes, comprising:

receiving information corresponding to the states of multiple electronic circuit breakers;

displaying the information corresponding to the states of the electronic circuit breakers in a menu-driven format at a graphical user interface;

presenting a pointer at the graphical user interface;

in response to a first command from a user, moving the pointer at the graphical user interface;

in response to a second command from the user, selecting an icon aligned with the pointer, the icon corresponding to a selected one of the electronic circuit breakers;

receiving a third command from the user;

in response to the third command, handling additional information corresponding to the electronic circuit breaker, or directing the electronic circuit breaker to change state, or both; and searching for a requested circuit breaker by a keyword corresponding to the circuit breaker.

24. A method for handling circuit breaker information and/or state changes, comprising:

receiving information corresponding to the states of multiple electronic circuit breakers;

displaying the information corresponding to the states of the electronic circuit breakers in a menu-driven format at a graphical user interface, wherein displaying the information corresponding to the states of the electronic circuit breakers includes displaying first information and first user-selectable input icons at a first location of the graphical user interface;

presenting a pointer at the graphical user interface;

in response to a first command from a user, moving the pointer at the graphical user interface;

in response to a second command from the user, selecting an icon aligned with the pointer, the icon corresponding to a selected one of the electronic circuit breakers;

receiving a third command from the user; and in response to the third command, handling additional information corresponding to the electronic circuit breaker, or directing the electronic circuit breaker to change state, or both, wherein handling additional information includes presenting the additional information to overlay the first information, and wherein the additional information includes additional user-selectable input icons that do not overlay the first input icons.

25. A method for handling circuit breaker information and/or state changes, comprising:

providing a dynamic list of circuit breakers, with the identity of circuit breakers on the dynamic list changing in response to a user input;

receiving information corresponding to the states of multiple electronic circuit breakers;

displaying the information corresponding to the states of the electronic circuit breakers in a menu-driven format at a graphical user interface;

presenting a pointer at the graphical user interface;

in response to a first command from a user, moving the pointer at the graphical user interface in response to a second command from the user, selecting an icon aligned with the pointer, the icon corresponding to a selected one of the electronic circuit breakers;

receiving a third command from the user; and in response to the third command, handling additional information corresponding to the electronic circuit breaker, or directing the electronic circuit breaker to change state, or both.

* * * * *

UNITED STATES PATENT AND TRADEMARK OFFICE
CERTIFICATE OF CORRECTION

| | |
|---|---|
| PATENT NO. | : 7,580,235 B2 |
| APPLICATION NO. | : 11/249127 |
| DATED | : August 25, 2009 |
| INVENTOR(S) | : George H. Hamasaki et al. |

It is certified that error appears in the above-identified patent and that said Letters Patent is hereby corrected as shown below:

Title page 2, in column 1, under "U.S. Patent Documents", line 70, delete "6,449,555 B1 9/2002 Pauly" and insert -- 6,449,556 B1 9/2002 Pauly --, therefor.

On sheet 18 of 21, in Figure 13, Ref. Numeral 1301, line 1, delete "CORRESONDING" and insert -- CORRESPONDING --, therefor.

In column 16, line 28, in claim 25, delete "interface" and insert -- interface; --, therefor.

Signed and Sealed this

Twenty-second Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,580,235 B2  Page 1 of 1
APPLICATION NO. : 11/249127
DATED : August 25, 2009
INVENTOR(S) : Hamasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 606 days.

Signed and Sealed this

Fourteenth Day of September, 2010

David J. Kappos
*Director of the United States Patent and Trademark Office*